US012599156B2

(12) United States Patent
De Souza Cunha et al.

(10) Patent No.: US 12,599,156 B2
(45) Date of Patent: Apr. 14, 2026

(54) COLOURING COMPOSITIONS

(71) Applicant: GIVAUDAN SA, Vernier (CH)

(72) Inventors: Luciana Andreia De Souza Cunha, Botucatu (BR); Altieres Almeida, Botucatu (BR); Alexandre Ferreira Costa, Sao Paolo (BR); Reginaldo Guilherme, Botucatu (BR); Fabio Magalhaes De Mello, Campinas (BR); Mathieu Tenon, Avignon (FR)

(73) Assignee: GIVAUDAN SA, Vernier (CH)

( * ) Notice: Subject to any disclaimer, the term of this patent is extended or adjusted under 35 U.S.C. 154(b) by 0 days.

(21) Appl. No.: 18/865,021

(22) PCT Filed: Jun. 1, 2023

(86) PCT No.: PCT/EP2023/064661
§ 371 (c)(1),
(2) Date: Nov. 12, 2024

(87) PCT Pub. No.: WO2023/232931
PCT Pub. Date: Dec. 7, 2023

(65) Prior Publication Data

US 2025/0107556 A1 Apr. 3, 2025

(30) Foreign Application Priority Data

Jun. 3, 2022 (GB) ..................................... 2208198

(51) Int. Cl.
*A23L 2/58* (2006.01)
*A23L 5/44* (2016.01)

(52) U.S. Cl.
CPC .. *A23L 5/44* (2016.08); *A23L 2/58* (2013.01)

(58) Field of Classification Search
CPC .................................... A23L 5/44; A23L 2/58
See application file for complete search history.

(56) References Cited

U.S. PATENT DOCUMENTS

| | | | | |
|---|---|---|---|---|
| 9,808,029 | B2 | 11/2017 | Fraser et al. | |
| 2017/0188612 | A1* | 7/2017 | Varadan ................ | A23L 13/426 |
| 2021/0298326 | A1* | 9/2021 | Zotter .................. | A23L 33/195 |

FOREIGN PATENT DOCUMENTS

| | | | |
|---|---|---|---|
| EP | 3628173 | | 4/2020 |
| WO | 2015153666 | A1 | 10/2015 |
| WO | 2019060759 | A1 | 3/2019 |

(Continued)

OTHER PUBLICATIONS

International Search Report for International Application No. PCT/EP2023/064661, mailed Sep. 4, 2023.

(Continued)

*Primary Examiner* — Jenna A Watts
(74) *Attorney, Agent, or Firm* — Curatolo Sidoti & Trillis Co., LPA; Floyd Trillis, III; Salvatore A. Sidoti

(57) ABSTRACT

The invention relates to novel food colouring compositions that are able to change their colour upon heating mimicking the colour appearance of meat changing from raw state to cooked or to fried meat in plant-based foodstuffs or beverages, and it further relates to foodstuffs comprising such colouring compositions, their use and to a method of providing the colouring composition as well as to a method of providing the respective foodstuff or beverage comprising the colouring composition.

12 Claims, 20 Drawing Sheets

(56) References Cited

FOREIGN PATENT DOCUMENTS

| | | | |
|---|---|---|---|
| WO | 2021022082 | A1 | 2/2021 |
| WO | 2021140148 | A1 | 7/2021 |
| WO | 2022043059 | A1 | 3/2022 |

OTHER PUBLICATIONS

International Written Opinion for International Application No. PCT/EP2023/064661, mailed Sep. 4, 2023.
Jay B. Fox Jr., "The Chemistry of Meat Pigments", J. Agr. Food Chem., dated 1966, vol. 14, No. 3, p. 207-210.
F. Guilhon-Simlicio et al., "Anti-inflammatory action of Justicia acuminatissima leaves", Brazilian Journal of Pharmacognosy, dated 2015, vol. 25, p. 264-268.
Jana Wood, et al., "Characterization of Isolated Extracts from Justicia Plant Leaves used as Remedy for Anemia", Molecules, Jan. 25, 2020, vol. 25, No. 3, p. 534.
Geone M. Corrêa, et al., "Chemical constituents and biological activities of species of Justicia—a review", Brazilian Journal of Pharmacognosy, Nov. 1, 2011, pp. 220-238.
Great Britain Search Report for Great Britain Serial No. 2208198.8, mailed on Nov. 22, 2022.

* cited by examiner

| Sample | Before frying | 5 min after frying |
|---|---|---|
| 25 | | |
| 24 | | |
| 27 | | |
| 28 | | |
| 23 | | |

Justicia raw material extract - sample 1 - HPLC chromatogram at 350 nm

Colouring composition - sample 16 - HPLC chromatogram at 350 nm

Colouring composition - sample 17 - HPLC chromatogram at 350 nm

Colouring composition - sample 18 - HPLC chromatogram at 350 nm

Colouring composition - sample 19 - HPLC chromatogram at 350 nm

Colouring composition - sample 22 HPLC chromatogram at 350 nm

COLOURING COMPOSITIONS

TECHNICAL FIELD

The present invention relates generally to colouring in foodstuffs and beverages. More particularly, the present invention provides novel food colouring compositions that are plant-based. It relates to foodstuff comprising said plant-based food colouring compositions that allow a foodstuff to change its colour upon heating. The present invention also encompasses the use of the plant-based foodstuff colouring composition for modulating the colour of the foodstuff or the beverage upon heating, and a method of providing a foodstuff or beverage that changes its colour upon heating.

BACKGROUND

It is known to use naturally occurring, naturally sourced and synthetic compounds for colouring products like foodstuff and beverages. Customers increasingly prefer colorants from natural sources over synthetic colorants. Colorants derived from natural sources such as plants, minerals or animals are exempt from certification with food authorities. Examples of exempt colorants are dehydrated beets (bluish-red to brown), beta-carotene (yellow to orange) or grape skin extract (red or green). The mentioned foodstuff colorants from natural sources have the disadvantage that they do not impart a colour transition upon heating which would be desirable for meat analogue products. Such a lack of colour change would for example lead to confusion of the customer trying to cook meat analogue products. The customer would possibly cook the product longer than necessary to see the expected colour change of actual meat from red to brown. In order to provide foodstuff replacing animal products like meat, poultry, fish or dairy, with plant-based ingredients mimicking the animal based foodstuff, colours being able to change to a different colour tone, particularly upon treatment such as heating or curing, are required. Particularly, this is the case for plant-based foodstuff that is supposed to mimicking the colouring characteristics of meat, poultry or fish changing from raw state to cooked or fried.

U.S. Pat. No. 9,808,029 B2 describes a heme-containing protein that is used as a colorant providing the colour change from red to brown in meat analogues in the same way meat does upon heating. It reads that there were several plant-based sources for such colour change but which cannot be sourced in quantities or concentrations that would allow the use in industrial scale.

WO202243059A1 offers a solution to the meat-like colouring imparting colour change upon heating by adding a phycoerythrobilin-containing protein.

Meat has the characteristic that it is reddish when it is uncooked but turns brownish as soon as it is heated to temperatures above 65° C. The mechanism behind this colour change is the oxidation of the myoglobin in the muscle cells forming the main part of the meat, typically 70 to 80%. As long as myoglobin remains in the reduced state, that means uncooked, it has a dark purple to red colour caused by the reversible equilibrium of myoglobin (purplish) and oxymyoglobin (red) which is the oxygenated form of myoglobin and usually in outer layers of the meat which is directly exposed to the oxygen in the air. Cooking leads to irreversibly reducing the myoglobin to the brownish metmyoglobin and its further decay via nitrosomyoglobin to the cured meat pigment, nitrosohemochrome. Typically, a temperature of at least 65° C. is required to finish the reduction of nitrosomyoglobin and to lead to nitrosohemochrome (J. B. Fox, The Chemistry of Meat Pigments, J. Agr. Food Chem., Vo. 14, no. 3, pp. 207-210, 1966). In the course of this curing process the heme iron is oxidized from ferrous (Fe (II)) to ferric (Fe (III)) state and the protein portion of the molecule is degraded. Thus, crucial for the formation of the brown meat pigment is the presence of myoglobin and of nitrite or nitrate.

Myoglobin is a molecule only known to be present in vertebrates but not in plants. Thus, achieving a comparable colour change in plant-based foodstuffs with plant-based materials is a great challenge. Therefore, there is a manifest need for food colouring compounds being able to change colour upon heating.

Plant-based products supposed to mimicking meat have very different properties than meat itself, apart from the colour for example, they have a different aroma, taste and texture. To improve the properties of these products, compounds having a taste related to meat can be added. Meat colouring and meat flavouring can also be useful in other products like bouillons, processed meat or hybrid meat, mostly comprising plant-derived proteins. A major difficulty in purely plant-based or hybrid meat is to mimic the colour change meat undergoes when heated. A further difficulty is that the colour typically does not impart a flavour characteristic to meat, which is desirable to reduce the number of ingredients or additives in a foodstuff. It is an increasing requirement in the industry, so-called clean labelling due to the increasing awareness of the customer. Thus, it is a further aim to provide a colouring mimicking the colour change of meat and imparting also a meaty flavour with one colorant in order to reduce the number of additives.

Thus, it is the aim of the present invention to provide plant-based colouring compositions that provide a colour change in plant-based foodstuff and beverages mimicking the colour change of meat and providing a positive contribution to the overall flavour impression of plant-based foodstuffs and beverages in which they are incorporated mimicking meat foodstuffs.

Plant extracts can be a source for colouring. The inventors investigated a wide range of plants to find suitable plant sources for the required natural foodstuff colouring. Extracts of *Justicia* plants of the genus of the Acanthaceae family, in particular the genus *Justicia acuminatissima* or *calycina*, offer such efficient food colouring systems. *Justicia* has been described in literature and is mentioned as a plant with anti-inflammatory properties, for example in: F. Guilhon-Simlicio et al., Anti-inflammatory action of *Justicia acuminatissima* leaves, Brazilian Journal of Pharmacognosy, Vol. 25 (2015) 264-268. Plants provide the advantage of clean labelling.

The inventors of the present invention have surprisingly found that extracts of the *Justicia* plant, in particular of the *Justicia acuminatissima* or *calycina* genus, are able to change colour from red to brown if the extracts, adjusted to a pH below 7, are heated. At a pH above 7, the extracts are green and become darker with higher pH. In addition, the extracts provide a certain "meaty" flavour and thus allow clean labelling and reduce the number of artificial or synthetic additives in the corresponding foodstuffs and beverages.

SUMMARY

In accordance with a first aspect, a colouring composition for foodstuffs or beverages is provided which is characterized in that the colouring composition contains lutein, iron in the ferrous state and optionally chlorophyll, characterized in that the colouring composition has a pH below 7.

In a second aspect of the present invention, the colouring composition is plant-based wherein the plant, which it is based on, is of the *Justicia* genus of the Acanthaceae family, preferably of the *Justicia acuminatissima* or *calycina* genus. Furthermore, the colouring composition is characterized in that the colour is customized to a red tone by adjusting the pH of the colouring composition to a pH below 7, preferably the pH is adjusted in a range between 4.5 and 6.8, more preferably between 4.5 and 6.5, most preferably between 4.5 and 5.5, while the colouring composition may further be characterized in that the colouring composition changes its appearance from a red tone to a brown tone upon heating to temperatures between 160° C. and 350° C., preferably between 180° C. to 300° C., more preferably between 220° C. to 300 and most preferably between 280° C. and 290° C.

A further aim of the present invention is to provide such a foodstuff colouring composition for meat analogue foodstuff products to impart a colour change upon heating the foodstuff which is derived of a natural source and which is not obtained synthetically or by biotechnological means.

Another aspect of the invention is that the colouring composition may also impart a certain sensation or taste that is favourable for use in a meat analogue product, such as a bloody, meaty and/or metallic taste note, and also a caramelized taste note, particularly upon heating, and/or a slightly astringent taste note.

In a third aspect, the invention provides a foodstuff comprising the plant-based colouring composition.

A fourth aspect of the invention is the use of a plant-based food colouring composition for modulating the colour of a foodstuff or a beverage, particularly upon heating, preferably from red to brown, similar to the colour change in meat upon heating.

A fifth aspect of the invention is a method of providing a plant-based foodstuff or a beverage that changes its colour, preferably from red to brown, upon heating to temperatures between 160° C. and 350° C., preferably between 180° C. and 300° C., more preferably between 220° C. and 300° C. and most preferably between 280° C. and 290° C., by adjusting the food colouring composition's pH to a pH below 7, preferably before cooking.

A sixth aspect of the present invention pertains to a method of providing a colouring composition by conducting the steps of

- (i) milling and sieving the aerial parts of the *Justicia* plant, preferably after drying them,
- (ii) extracting the aerial parts of the *Justicia* plant by contacting them with a solvent for at least 1 hour,
- (iii) preferably filtrating the resulting extract
- (iv) optionally concentrating the resulting extract
- (v) modulating the pH of the colouring composition to a pH below 7 for colour adjustment to a red colour tone, preferably to a pH between 4.5 and 6.8, more preferably 4.5 and 6.5 and most preferably between 4.5 and 5.5 and
- (vi) optionally adding a compound selected from glycerol, propylene glycol, glucose syrup, polysorbate, trehalose, or a combination thereof.

Furthermore, the method of providing a colouring composition wherein the solvent is selected from the group of water, an alcohol or polyol, or a combination thereof, wherein the alcohol is preferably ethanol, wherein the solvent is preferably comprised in an amount of 5-20 times the weight of the plant parts, and wherein the solvent preferably comprises at least 20 wt % of water.

In a further aspect of the invention a plant-based colouring composition for foodstuffs or beverages is provided that is characterized in that the plant, which it is based on, is of the *Justicia* genus of the Acanthaceae family, preferably of the *Justicia acuminatissima* or *calycina* genus, and in that the colour is customized to green by adjusting the pH of the colouring composition to a pH above 7.

The details, examples and preferences provided in relation to any particular one or more of the stated aspects of the present invention will be further described herein and apply equally to all aspects of the present invention. Any combination of the embodiments, examples and preferences described herein in all possible variations thereof is encompassed by the present invention unless otherwise indicated herein, or otherwise clearly contradicted by context.

DETAILED DESCRIPTION

Figure 1:
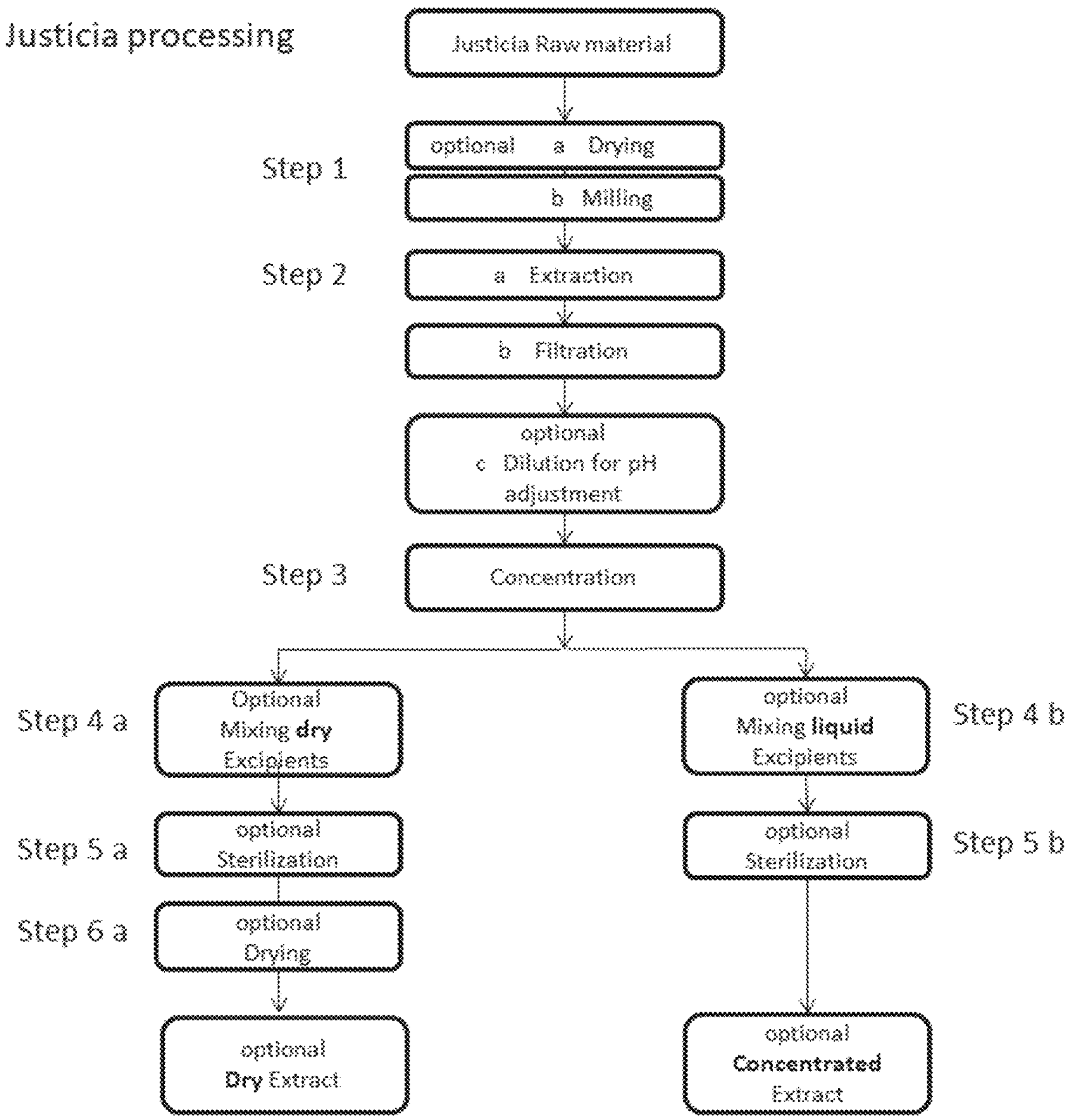
FIG. 1: Flowchart of the processing steps of *Justicia* from raw material to dry extracts or concentrates and blended dry extracts or concentrates
Figure 2:
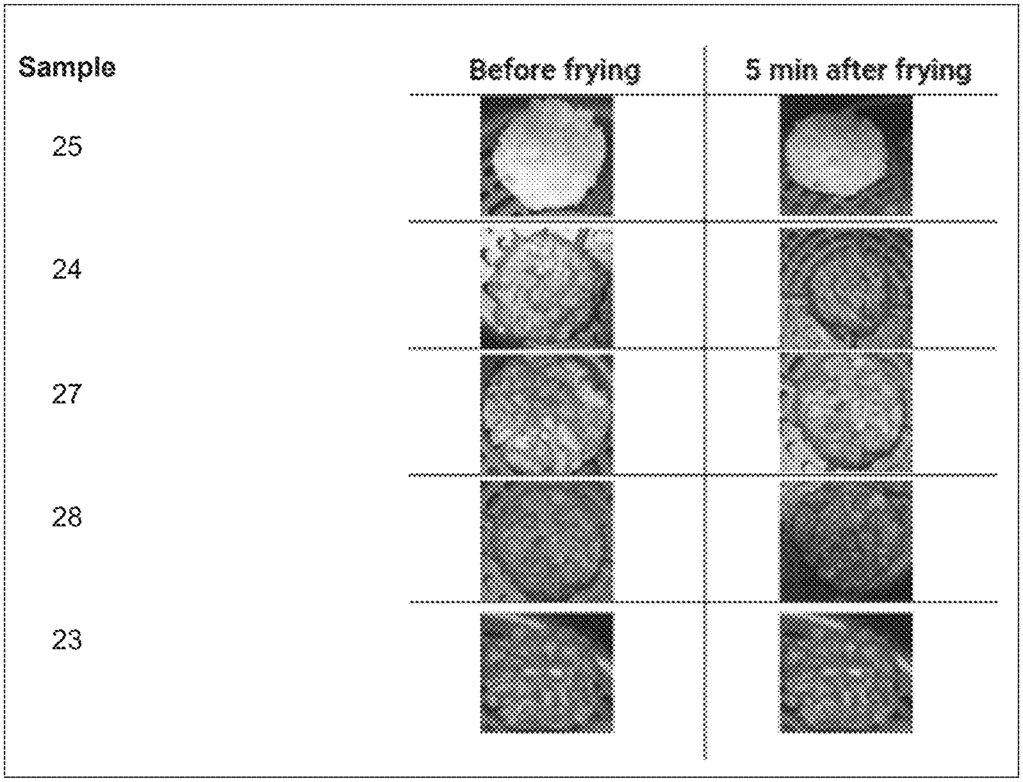
FIG. 2: Meat analogue burger patties before and after frying for samples 23-25, 27-28; for which the results are provided in table 5b
Figure 3:
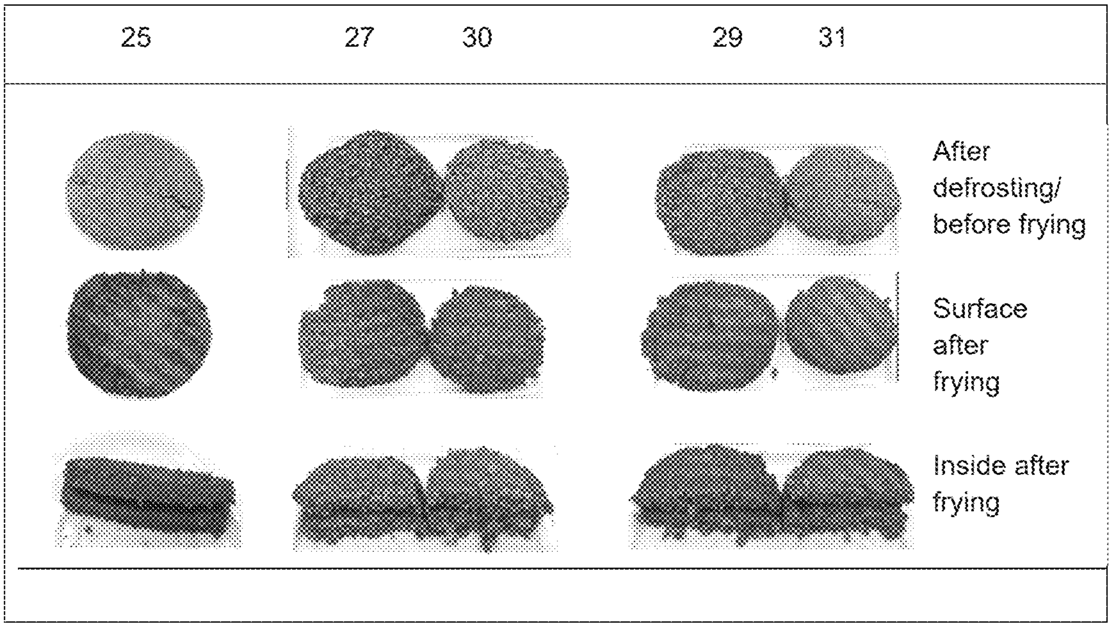
FIG. 3: Meat analogue burger patties before and after frying—surface and inside—samples 25, 27, 29-31; for which the results are given in table 5b
Figure 4:
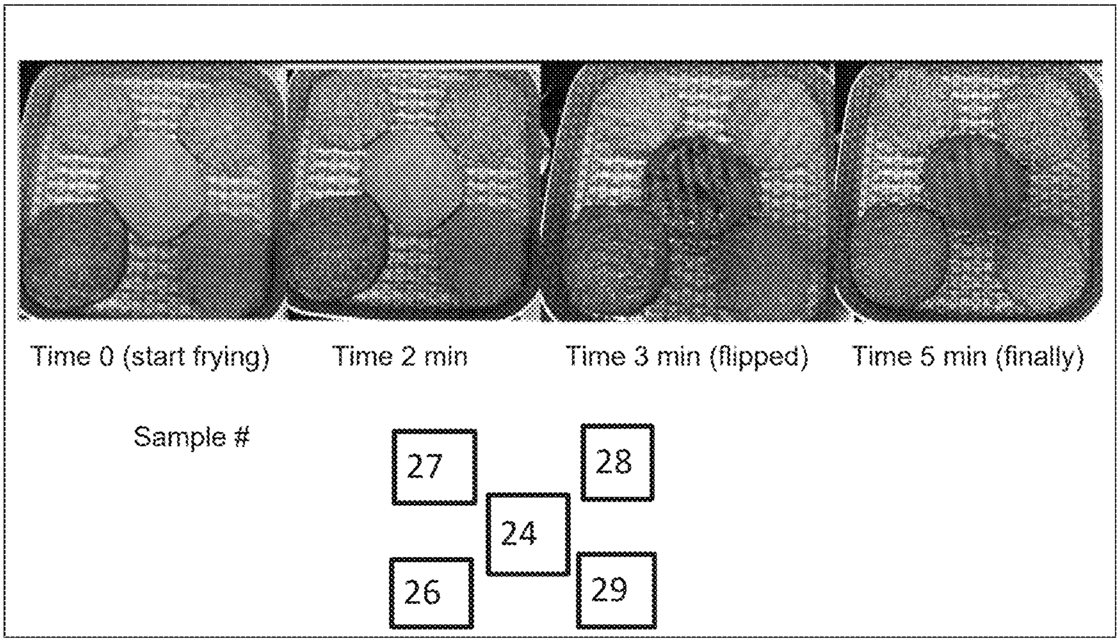
FIG. 4: Meat analogue burger patties during frying process—samples 24, 26-29; for which the results are given in table 5b
Figure 5:
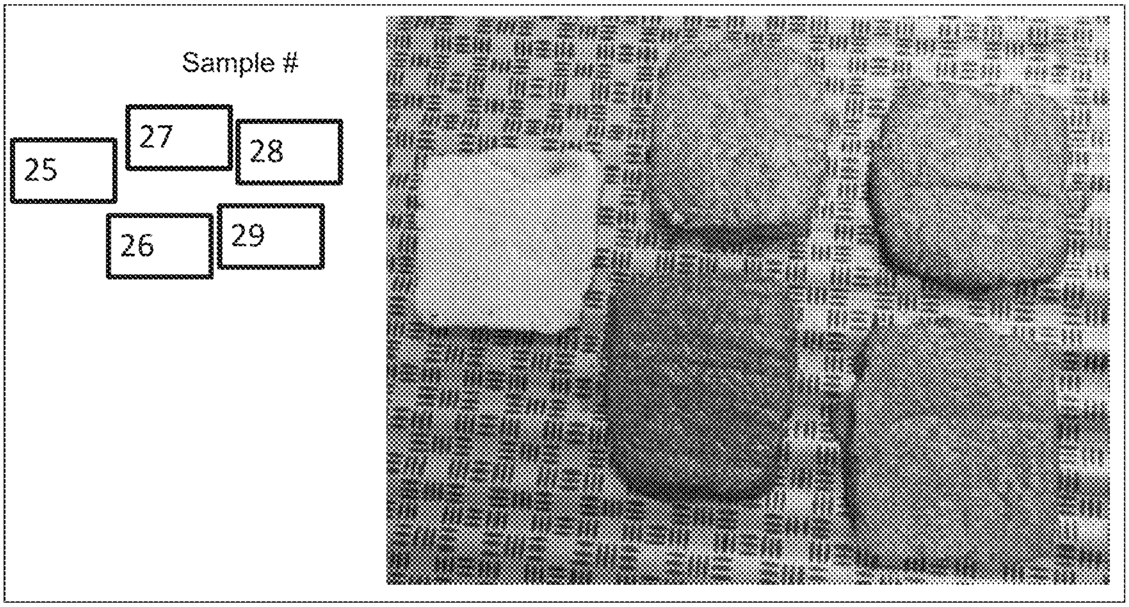
FIG. 5: Meat analogue burger patties before frying—samples 25-29; for which the results are given in table 5b
Figure 6:
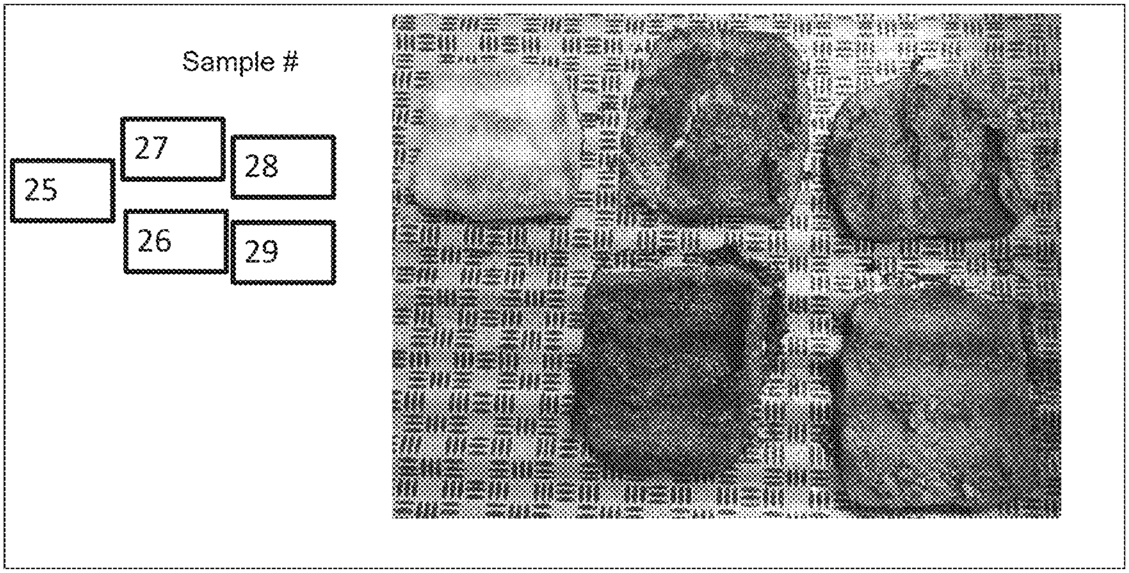
FIG. 6: Meat analogue burger patties after frying—samples 25-29; for which the results are given in table 5b
Figure 7:
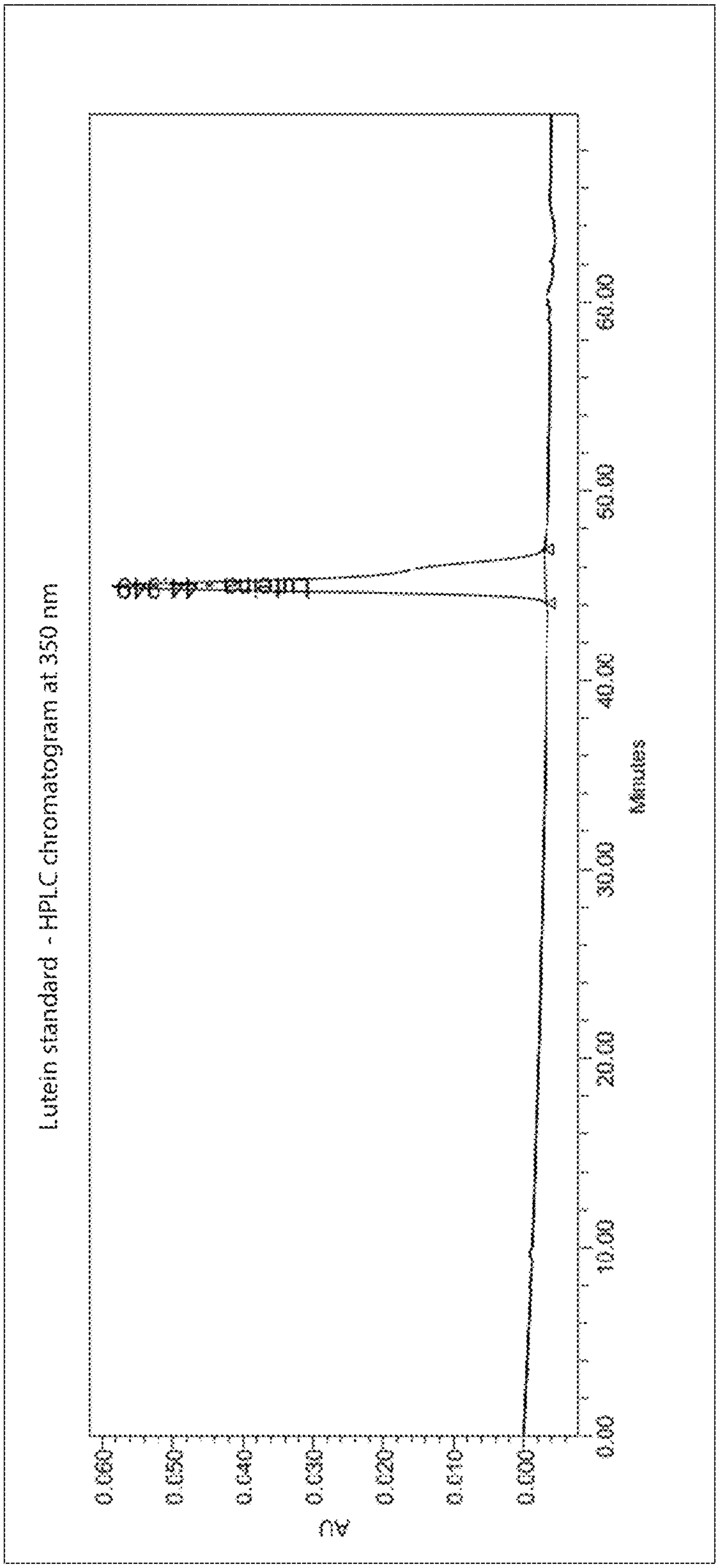
FIG. 7: Lutein HPLC study—Lutein standard—HPLC chromatogram at 350 nm
Figure 8:
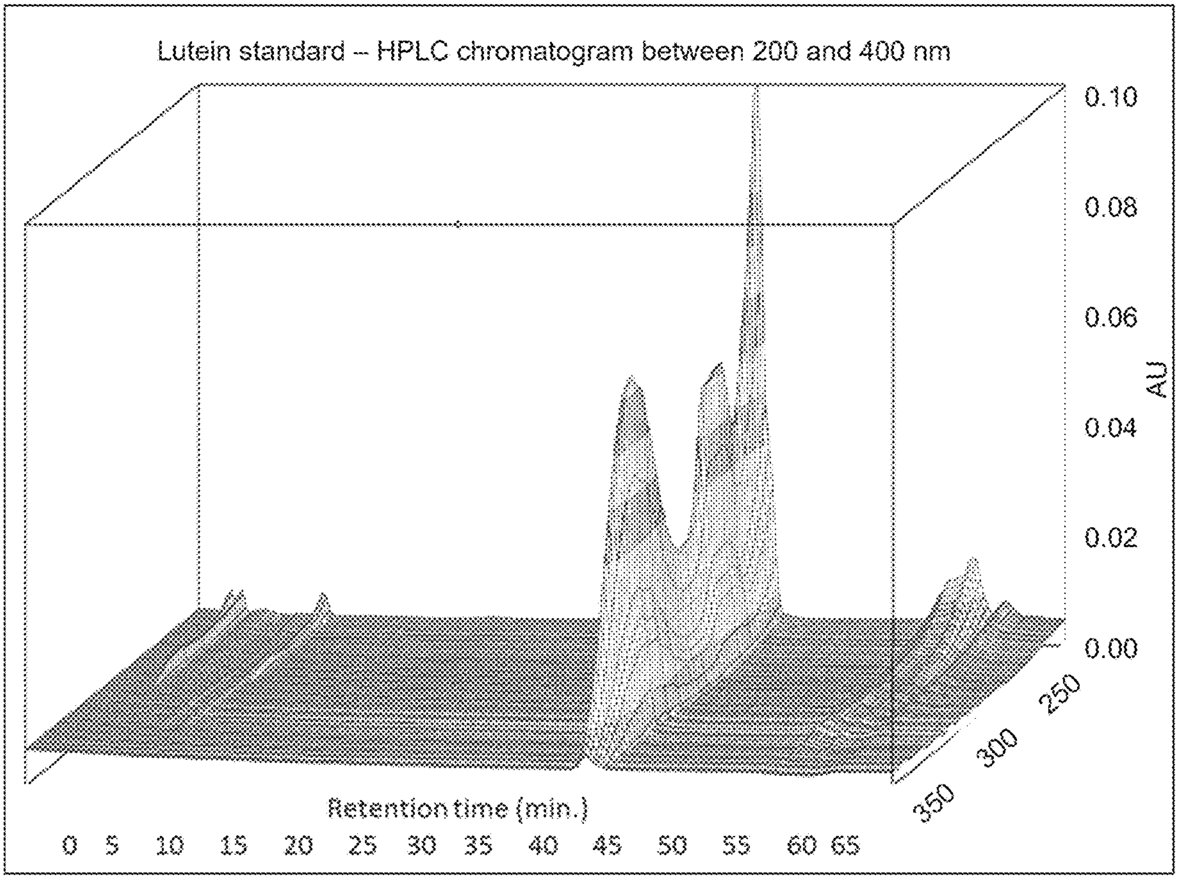
FIG. 8: Lutein HPLC study—Lutein standard—HPLC chromatogram between 200 and 400 nm
Figure 9:
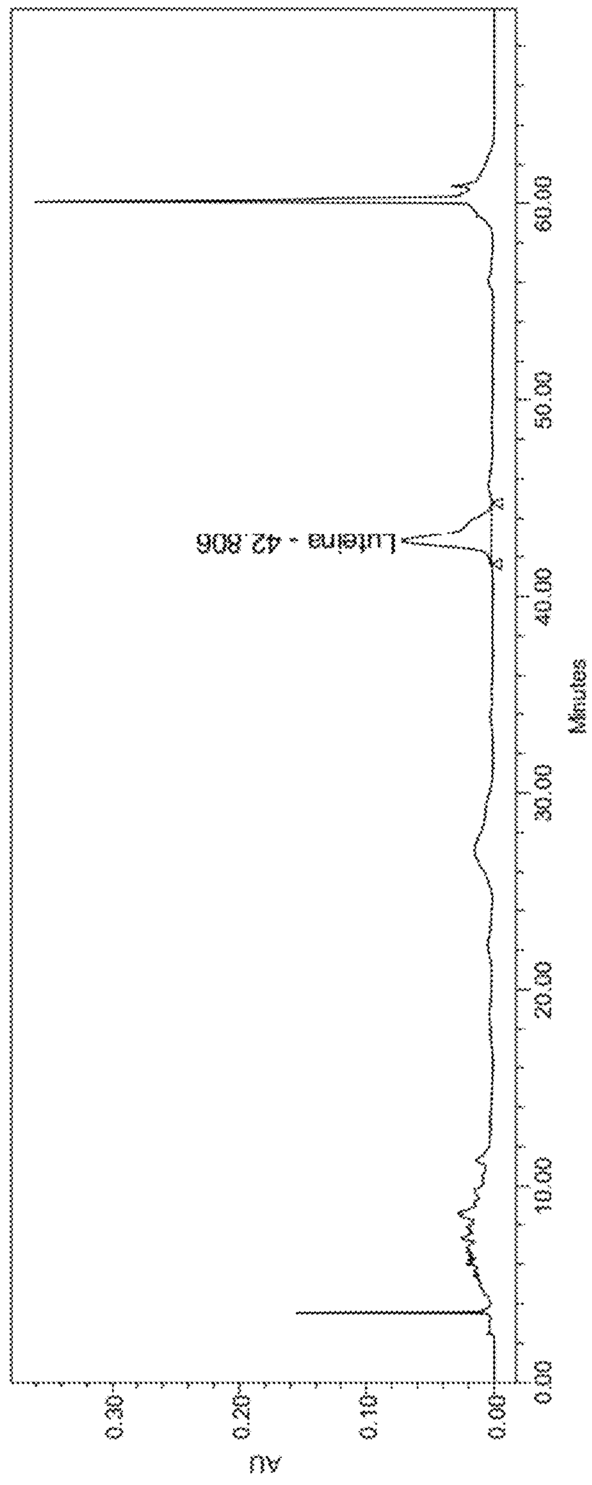
FIG. 9: Lutein HPLC study—*Justicia* raw material extract—HPLC chromatogram at 350 nm
Figure 10:
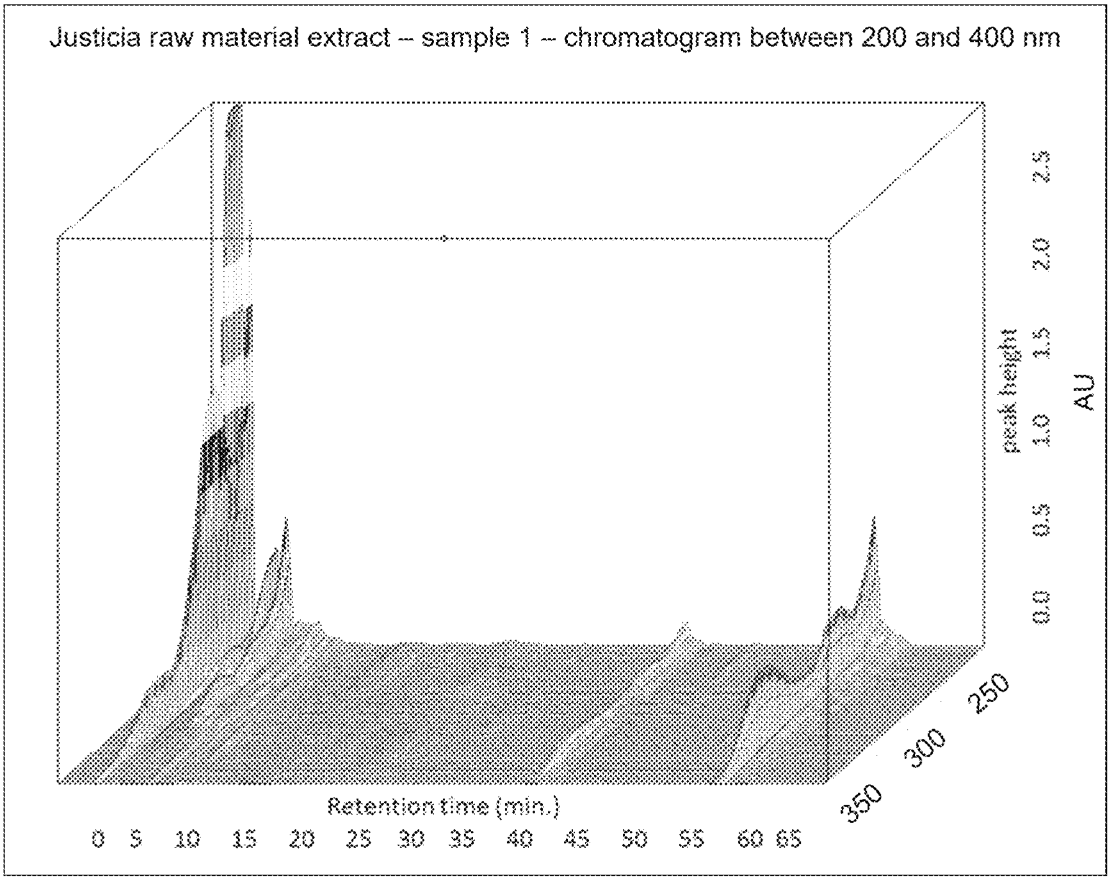
FIG. 10: Lutein HPLC study—*Justicia* raw material extract—HPLC chromatogram between 200 and 400 nm
Figure 11:
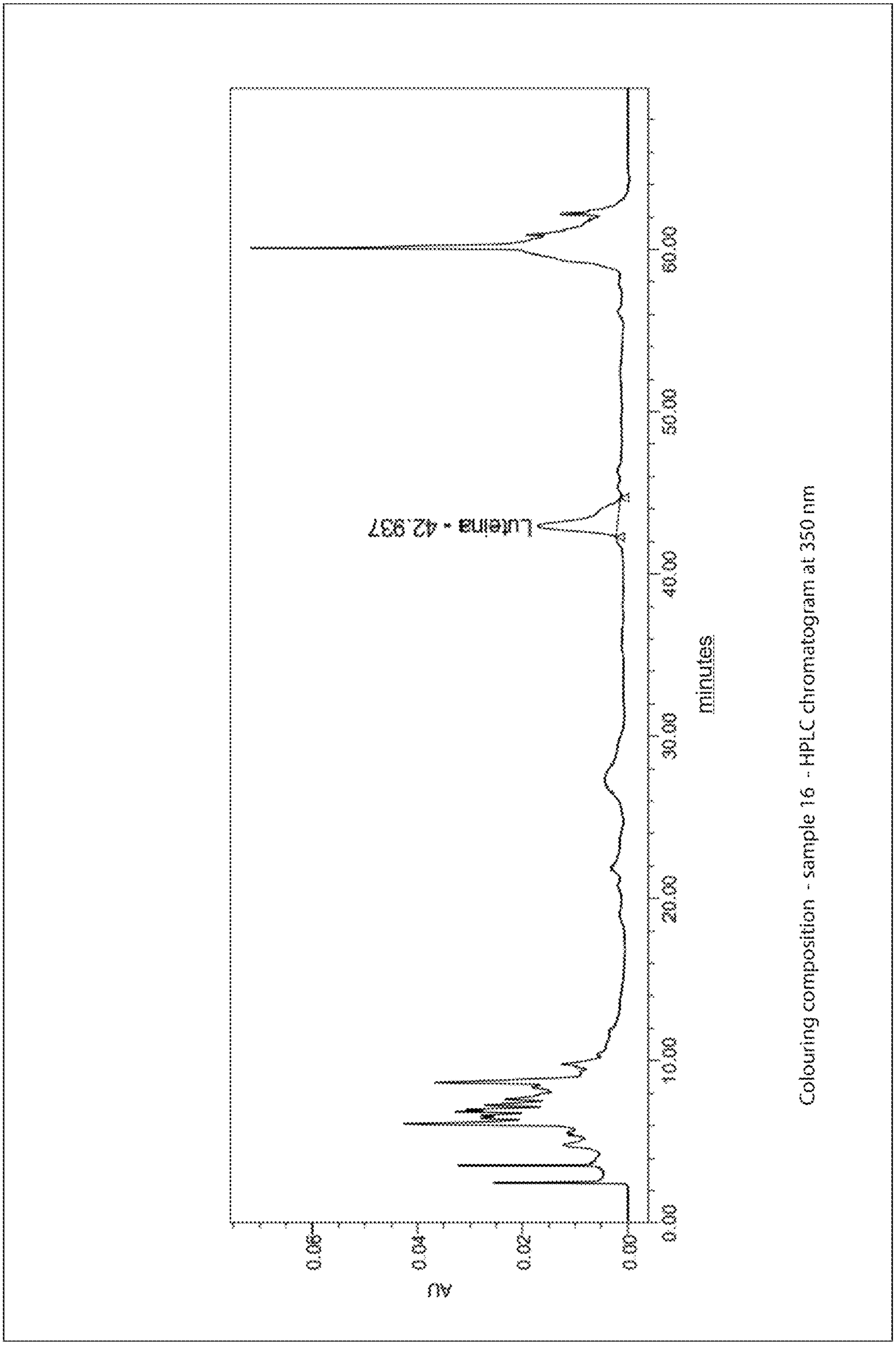
FIG. 11: Lutein HPLC study—Colouring composition—sample 16-HPLC chromatogram at 350 nm
Figure 12:
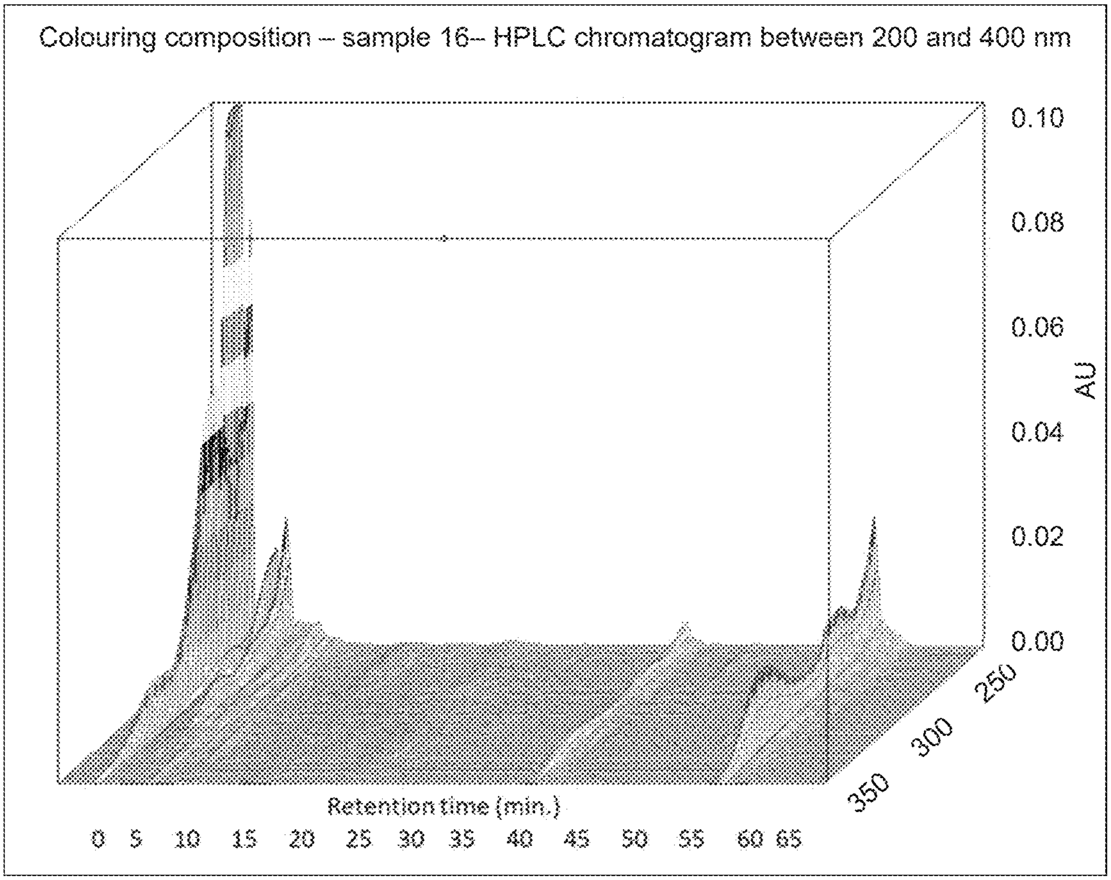
FIG. 12: Lutein HPLC study—Colouring composition—sample 16-HPLC chromatogram between 200 to 400 nm
Figure 13:
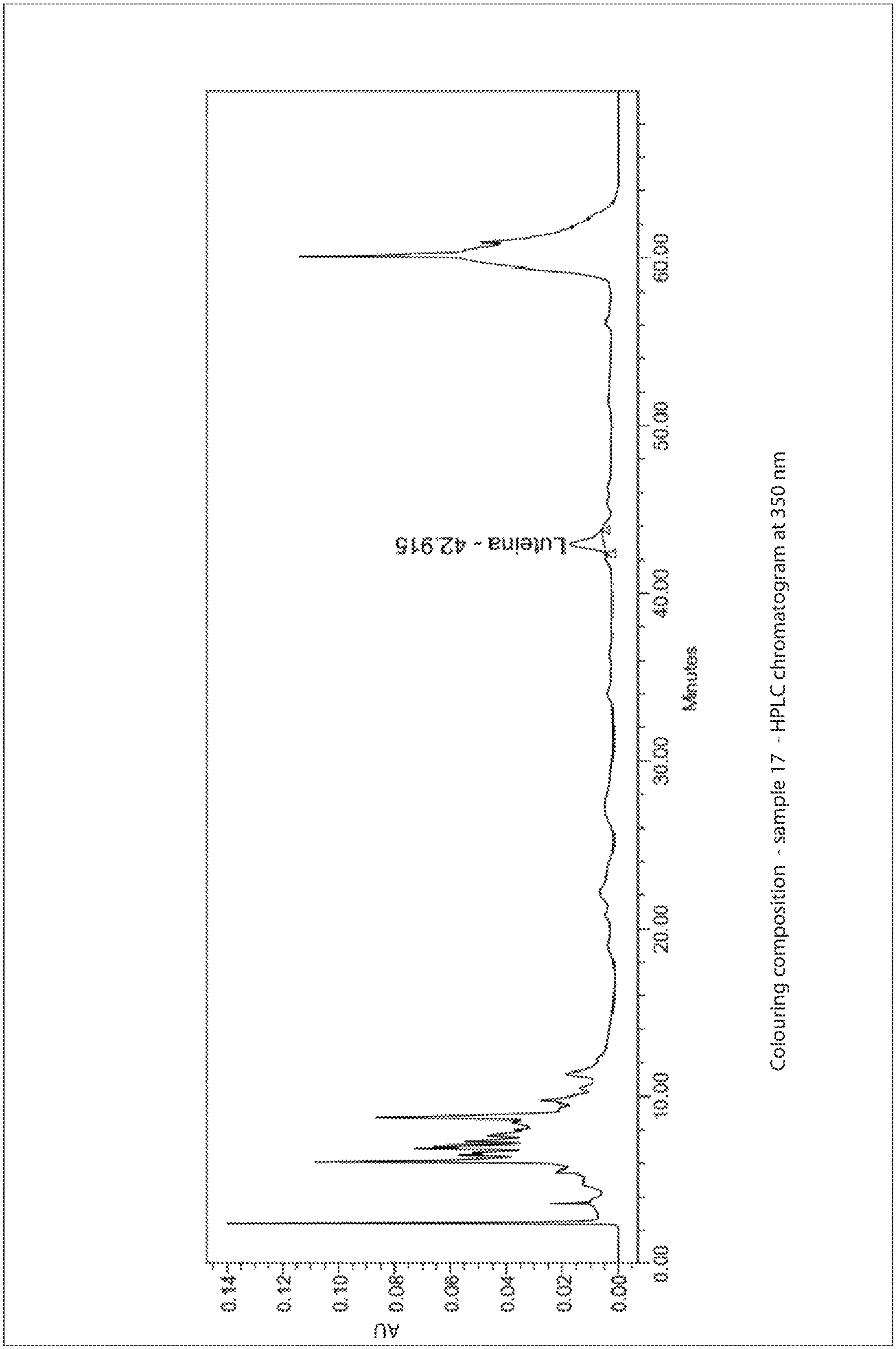
FIG. 13: Lutein HPLC study—Colouring composition—sample 17-HPLC chromatogram at 350 nm
Figure 14:
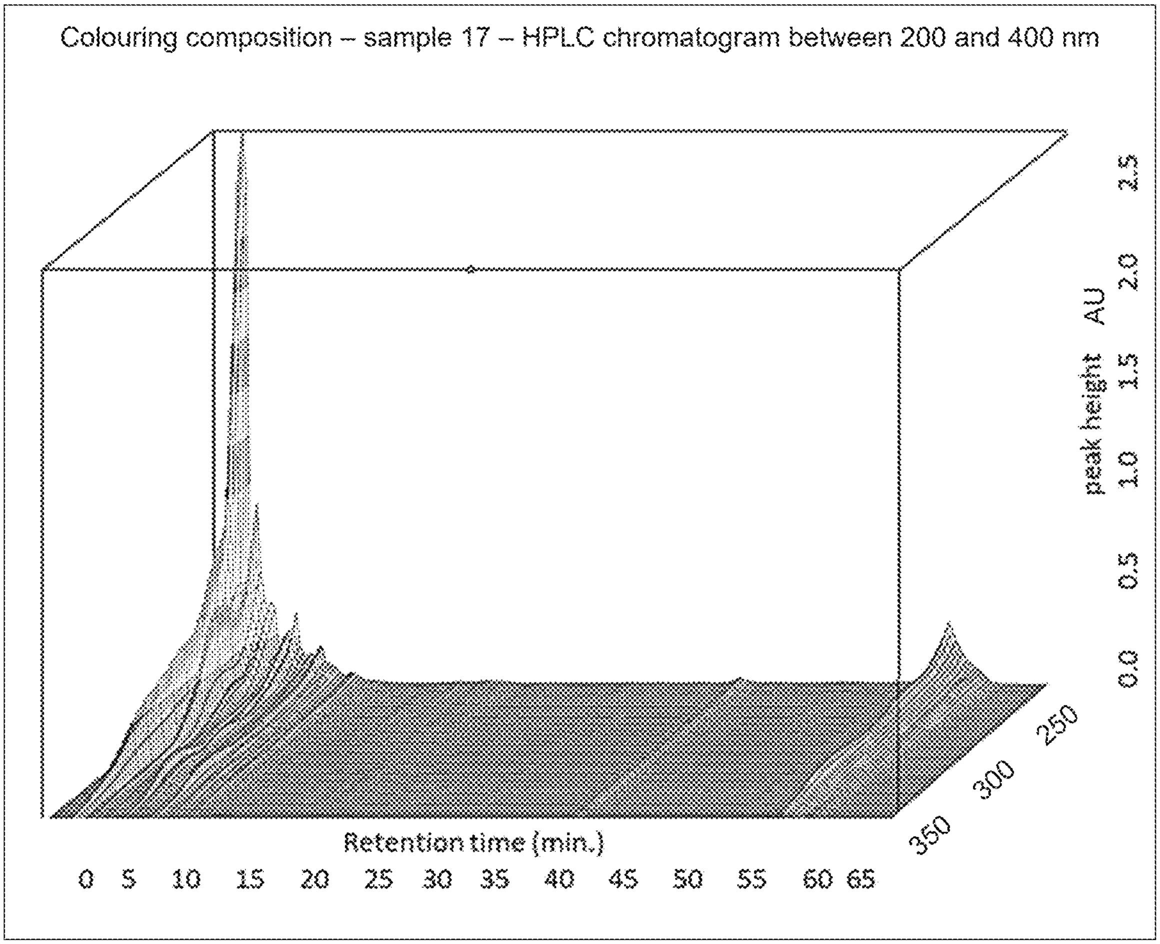
FIG. 14: Lutein HPLC study—Colouring composition—sample 17-HPLC chromatogram between 200 to 400 nm
Figure 15:
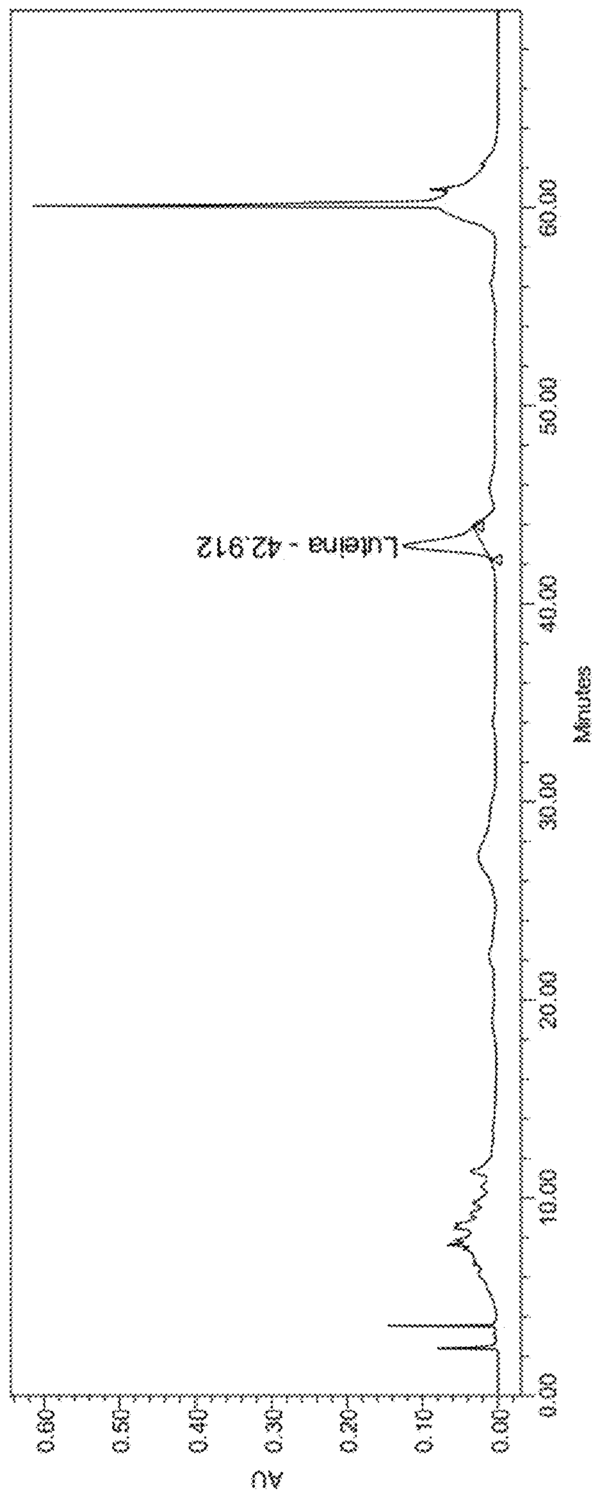
FIG. 15: Lutein HPLC study—Colouring composition—sample 18-HPLC chromatogram at 350 nm
Figure 16:
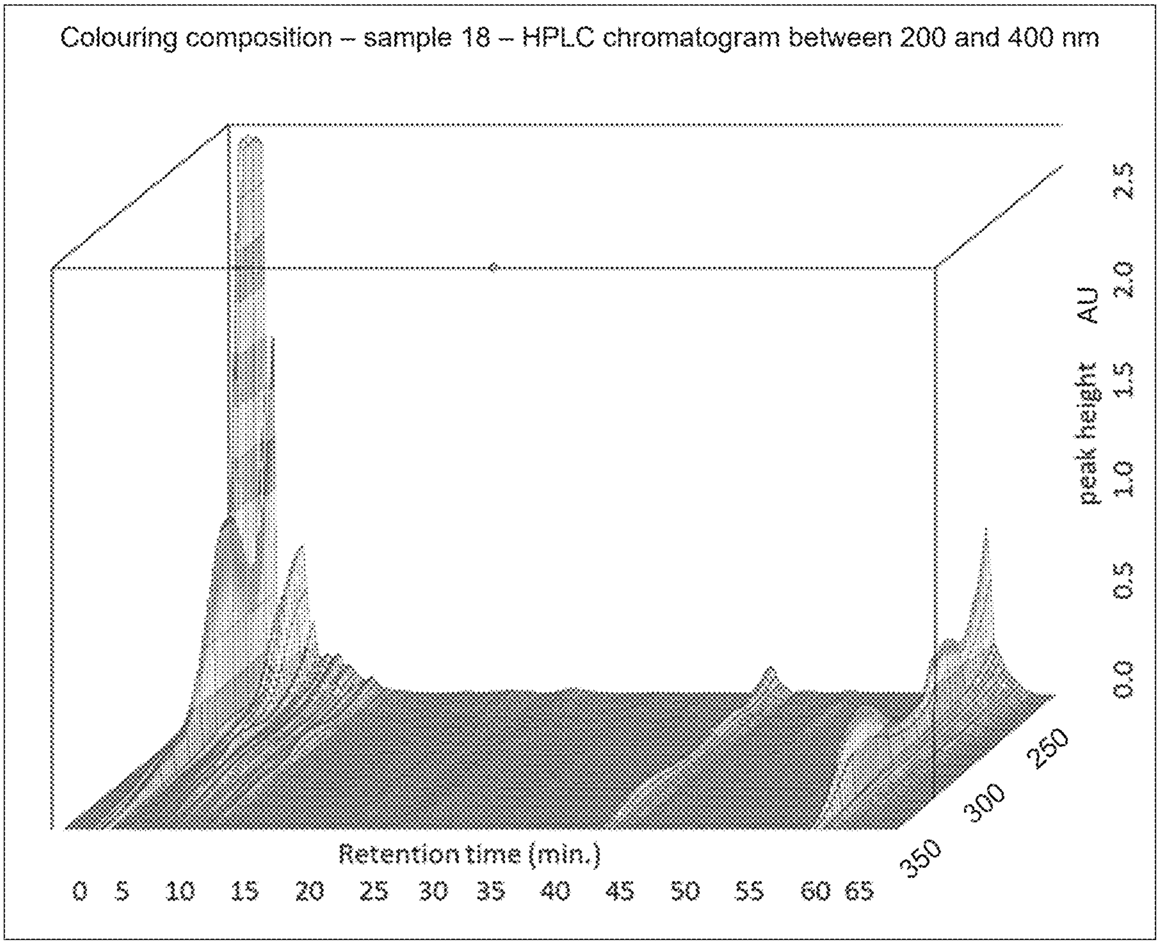
FIG. 16: Lutein HPLC study—Colouring composition—sample 18-HPLC chromatogram between 200 to 400 nm
Figure 17:
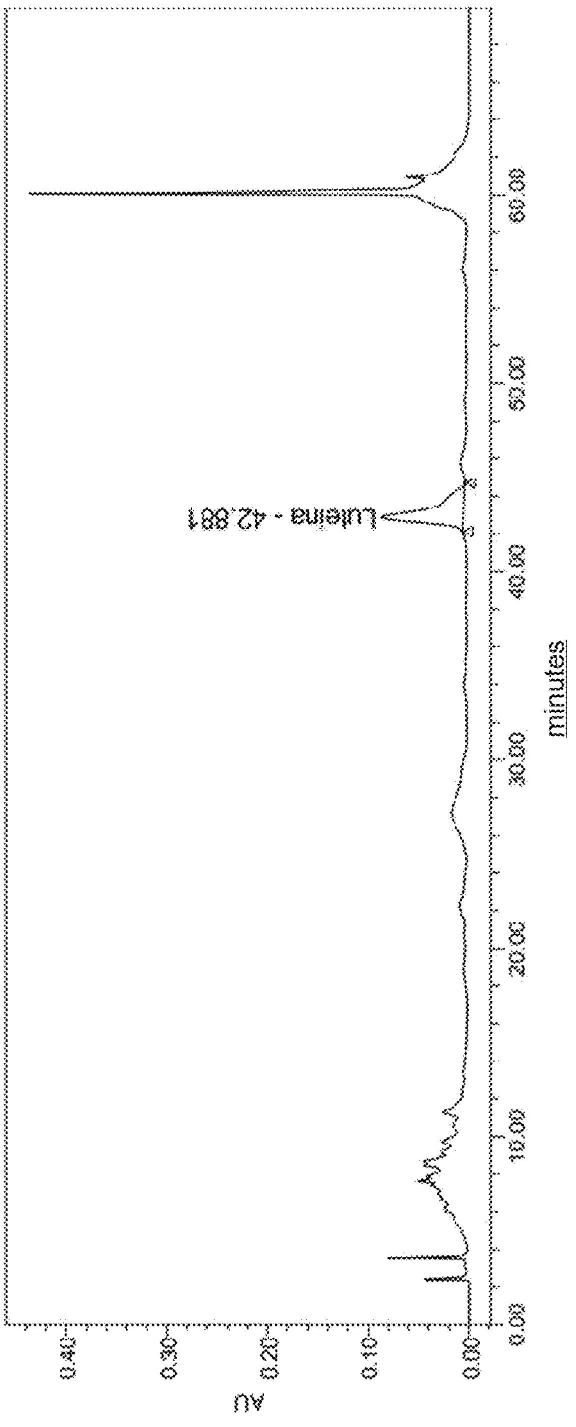
FIG. 17: Lutein HPLC study—Colouring composition—sample 19-HPLC chromatogram at 350 nm
Figure 18:
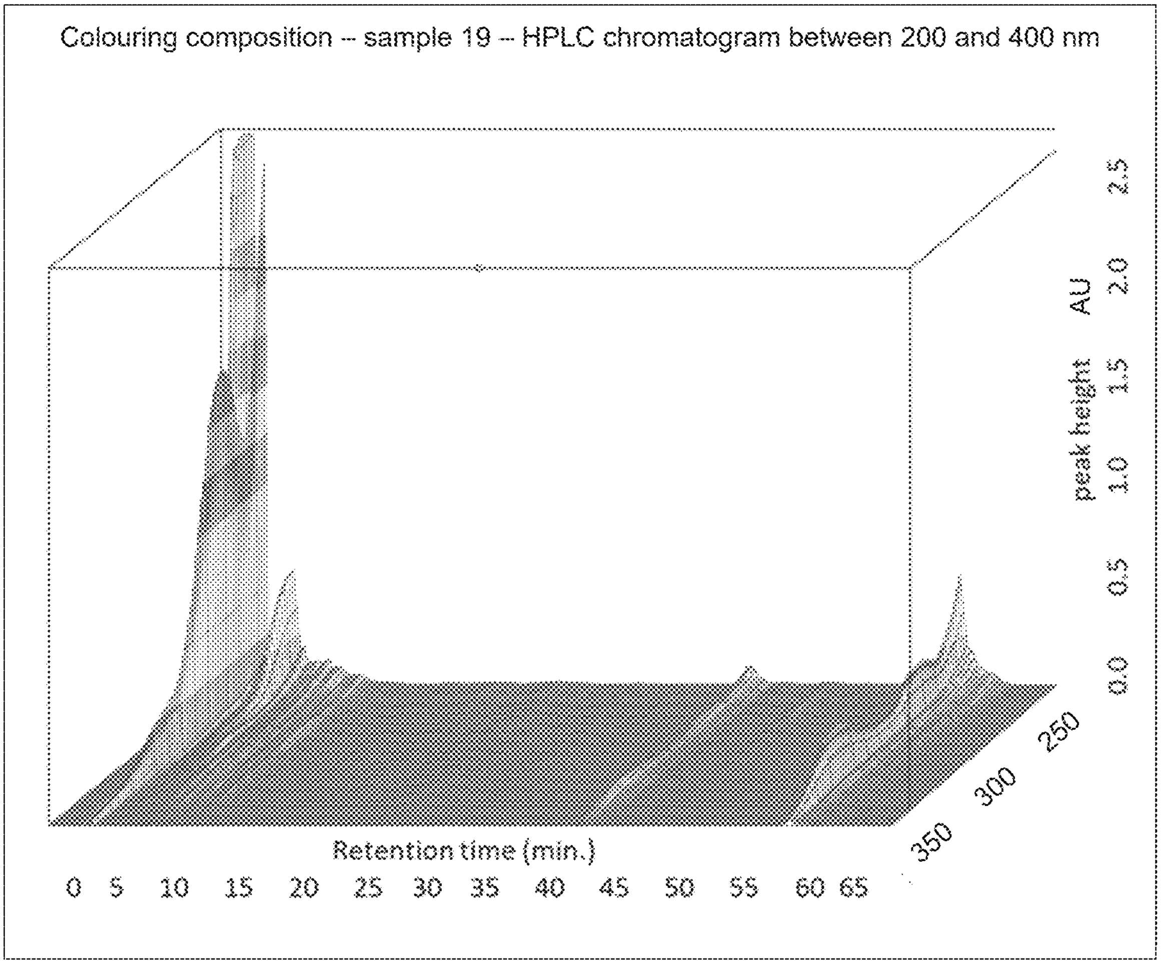
FIG. 18: Lutein HPLC study—Colouring composition—sample 19-HPLC chromatogram between 200 to 400 nm
Figure 19:
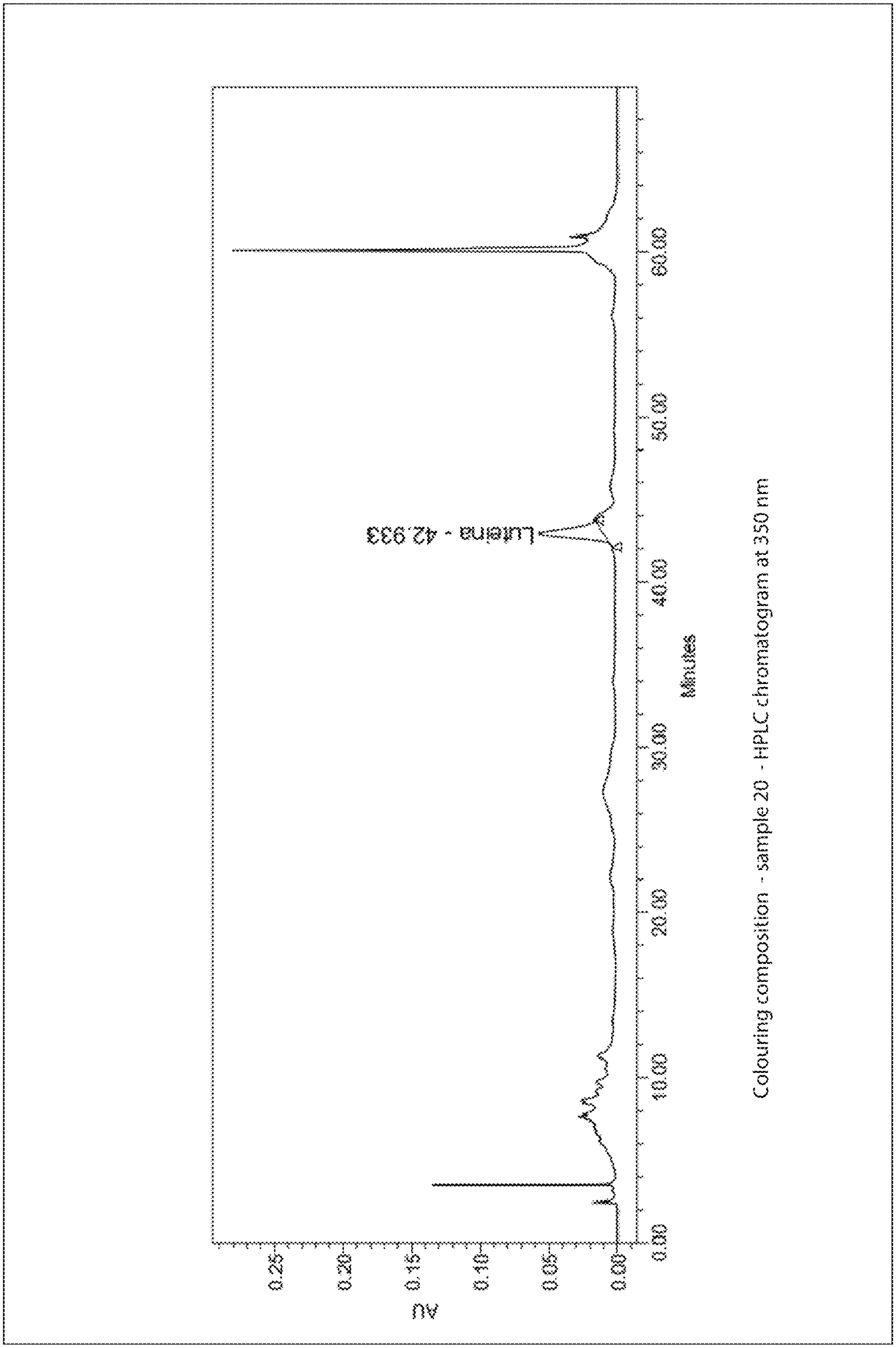
FIG. 19: Lutein HPLC study—Colouring composition—sample 20-HPLC chromatogram at 350 nm
Figure 20:
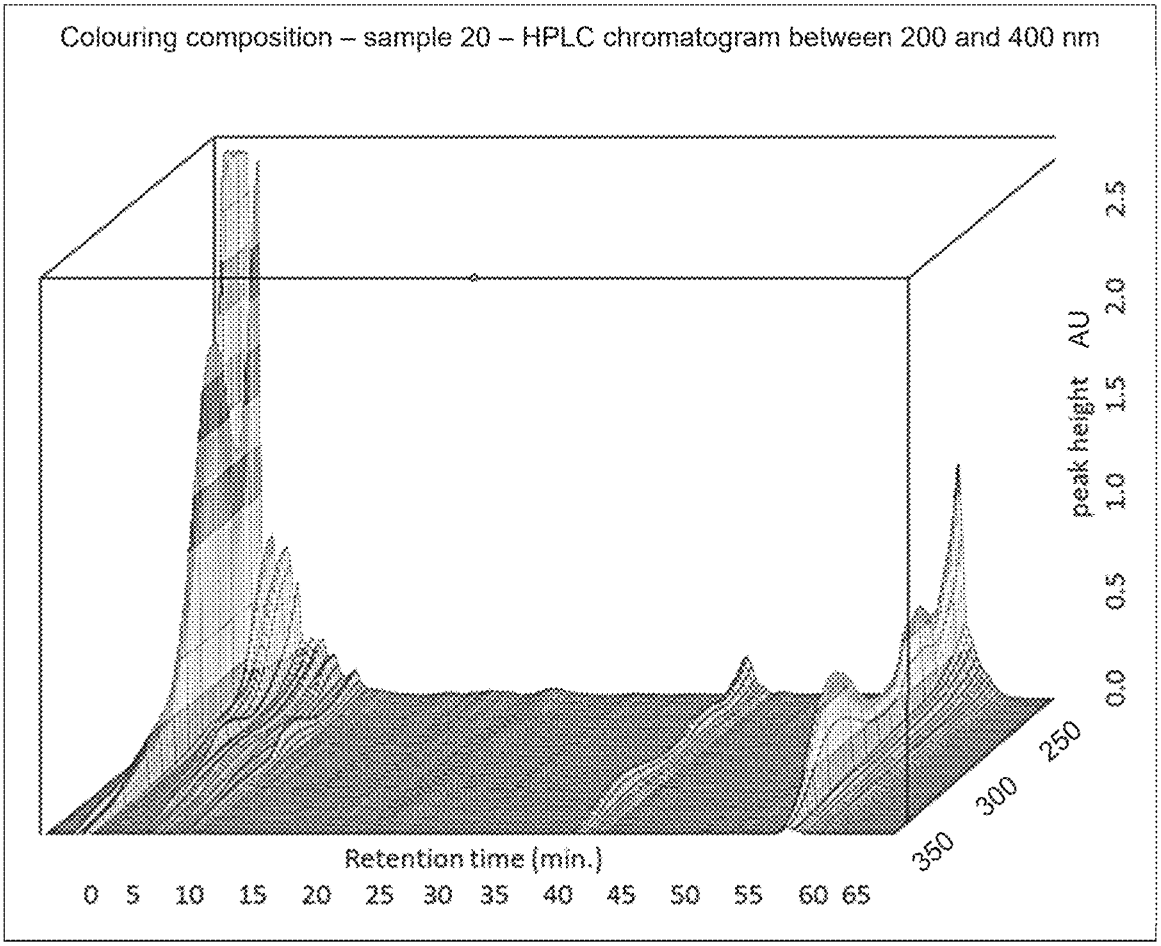
FIG. 20: Lutein HPLC study—Colouring composition—sample 20-HPLC chromatogram between 200 to 400 nm
Figure 21:
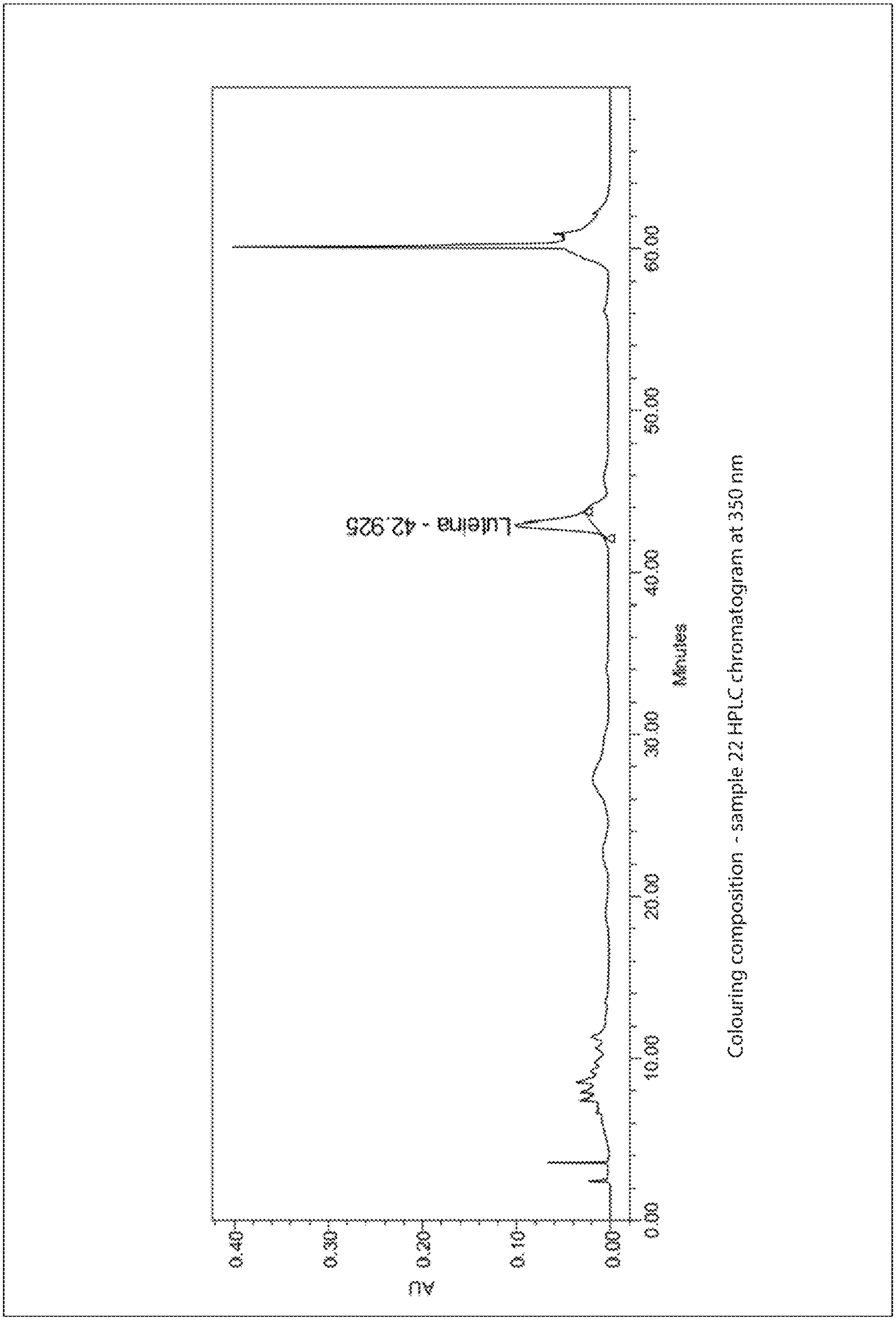
FIG. 21: Lutein HPLC study—Colouring composition—sample 22-HPLC chromatogram at 350 nm
Figure 22:
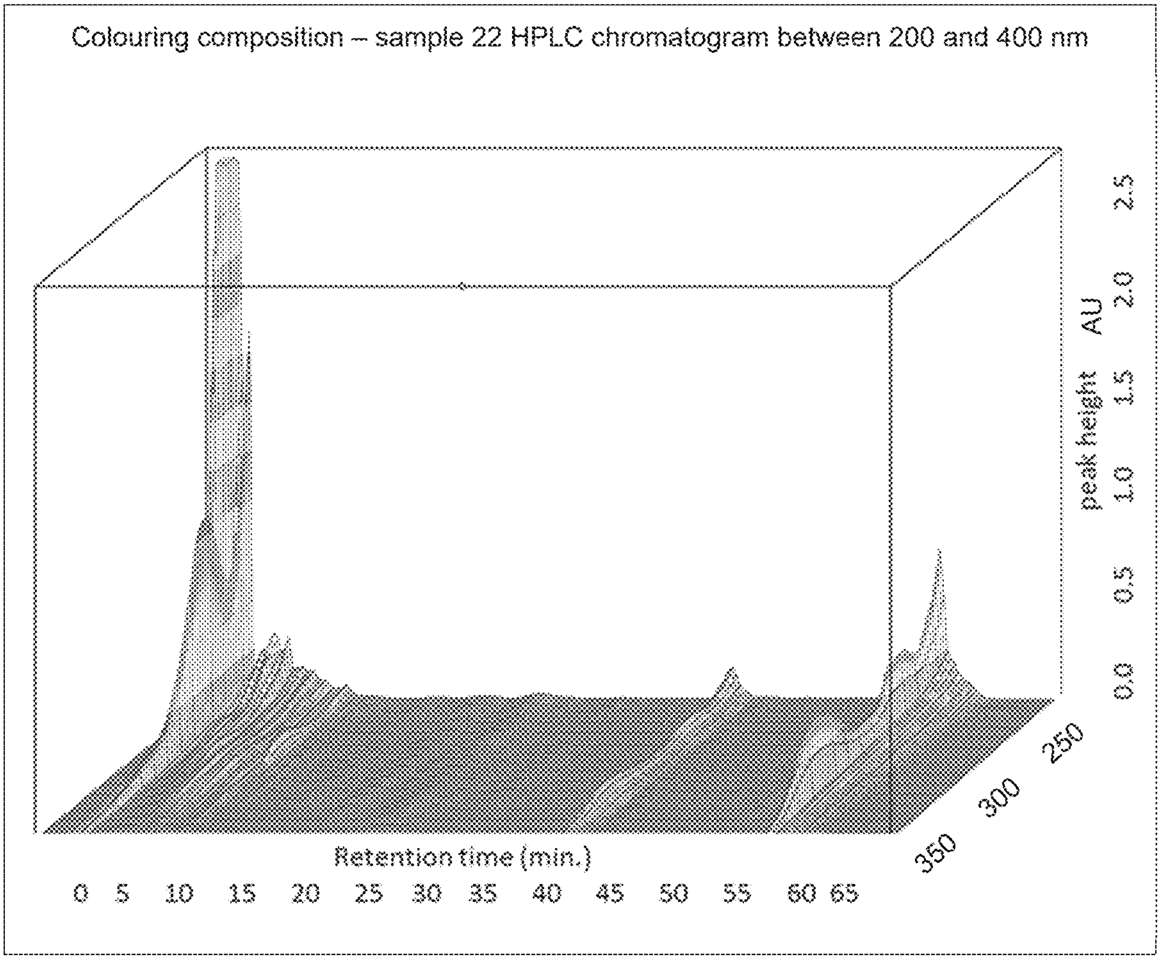
FIG. 22: Lutein HPLC study—Colouring composition—sample 22-HPLC chromatogram between 200 to 400 nm

The present invention is based on the surprising finding that a plant-based colouring composition derived from the *Justicia* genus of the Acanthaceae family, in particular from the genus *Justicia acuminatissima* or *calycina*, shows a change in colour, preferably from reddish to brownish, upon heating the extract or corresponding foodstuff products if the pH of the colouring composition has been adjusted to a pH below 7, preferably to a pH between 4.5 and 6.8, more preferably between 4.5 and 6.5, most preferably between 4.5 and 5.5, preferably before the colouring composition, or the respective product comprising it, is heated.

The present inventors investigated the plant-based colouring composition for compounds that may be responsible for the colour change upon heating and found that a colouring composition should at least comprise lutein and iron in the ferrous state to provide a colour change from red to brown, optionally comprising chlorophyll, and the colouring composition having a pH below 7.

The present invention particularly pertains to a plant-based colouring composition for foodstuffs or beverages characterized in that the plant, which it is based on, is of the *Justicia* genus of the Acanthaceae family, preferably of the *Justicia acuminatissima* or *calycina* genus, and in that the colour is customized, preferably to a red tone, by adjusting the pH of the colouring composition to a pH below 7, preferably to a pH between 4.5 and 6.8, more preferably between 4.5 and 6.5, most preferably between 4.5 and 5.5, and that the colouring composition changes its appearance preferably from a red tone to a brown tone upon heating to temperatures between 160° C. and 350° C., preferably to a temperature between 180° C. and 300° C., more preferably between 220° C. and 300° C. and most preferably between 280° C. and 290° C.

It was found, that the above-mentioned colouring composition is a very useful ingredient which is furthermore capable of imparting highly appreciated taste and odour sensations to the compositions and products in which it is incorporated.

In particular, the colouring composition imparts the odour and/or taste described as slightly "astringent", and as distinctly "bloody", "meaty" and "metallic", in particular "metallic as in raw meat". Such odour and taste is for example typically related to meat. The colouring composition can impart also a caramelized taste note, particularly if the colouring composition is exposed to higher temperatures, particularly over a longer period of time, such as for concentrating and/or drying the plant extract, or upon frying, cooking or oven heating of a product comprising the colouring composition.

"Foodstuff" herein also called meat analogue or meat replacement or meat substitute or meat alternative, refers herein to plant-based foodstuff comprising vegetable sourced ingredients, like algae, (green) vegetables, legumes, pulses, fungi, nuts, seed, cereals and grains, and which are similar to meat in appearance, odour, taste, flavour, texture and preferably provide to some extent relevant nutrients, particularly proteins, comparable to meat.

The "plant-based foodstuff" as defined herein may also comprise small amounts of meat with the purpose to reduce exploitation of animal resources and to reduce the carbon footprint, defined as the emission of total greenhouse gases (GHG), of conventional industrial meat production by using only small portions of meat added to plant-based proteins being the main ingredient. The carbon footprint can even be further reduced by using meat from alternative animal based sources. Alternative animal based sources comprise processed animal proteins from animals that are not typically used for industrial meat production, such as insects such as worms, maggots, larvae or grown insects. Another alternative, an animal based source, making its way into the food industry is cultured or cultivated meat which is produced from cultivated animal cells by applying biotechnological methods. Products comprising such animal based meat as described herein above and plant-based proteins are called hybrid products and they provide not only a lower carbon footprint but contain less fat, in particular less saturated fat, and less unhealthy ingredients but offer the health benefits of plant-based food and yet providing a high protein content.

"Beverages" mean drinkable liquid or semi-liquid plant-based foodstuffs such as but not limited to soups, bouillon, broth, or baby food.

The term "meat" as used herein shall include red meat, such as beef, pork, lamb and wild game, as well as poultry like chicken, turkey or ostrich, or red tuna. This includes also cultivated or cultured meat obtained by biotechnological methods from cells of these animal meats as listed above.

"Colouring composition" means a composition of compounds preferably derived from a plant extract, more preferably the composition of compounds as comprised in the extract of a *Justicia* genus plant, most preferably the *Justicia acuminatissima* or *calycina* genus, obtained by the methods described herein, but not limited to them, and being suitable to provide colouring to the foodstuff or the beverage as described herein, and to provide a change of colour upon heating to temperatures between 160° C. to 350° C.

"Reddish or red" appearance or tone, as mentioned in the present invention, shall mean a colour appearance within the colour spectrum from purple to red and pink particularly resembling raw, meaning un-cooked or un-fried, meat.

"Brownish or brown" appearance or tone, as mentioned in the present invention, shall mean a colour appearance within the colour spectrum from brown to grey, particularly resembling cooked of fried meat.

"Change of colour" means the colouring composition being suitable to provide a reddish colour to be formulated in a foodstuff or a beverage as defined herein, and changing its colour upon heating the colouring composition, or the respective foodstuff comprising it, to a brownish colour appearance or tone to indicate a change of state of the foodstuff from raw to cooked or fried.

The different gradients of red or brown can be described by the CIELAB colour space (CIE stands for Commission on Illumination) according to the standard as defined in ISO/CIE 11664-4-2019 wherein the colour space is expressed as three values L* for "Luminosity" expressing the gradient of lightness from black (0) to white (100), a* or "A" from green (−) to red (+), and b* or "B" from blue (−) to yellow (+) to visualize the numerical change of colour roughly the same amount of the visually perceived change of colour. This means the higher the a* or "A" value the redder it is perceived. A neutral grey would be expressed as an a* or "A" value and a b* or "B" value of (0) each. Brown tones would have a low L* value and a higher a* or "A" value.

The colouring composition varies in colour depending on the pH. Above pH 7 the colouring composition is green, the higher the pH the darker the green. At a pH below 7 the colouring composition is red. With lower pH the red intensifies.

The pH may be adjusted by diluting the colouring composition with water. Acidifiers or basifiers may also be added to the colouring composition to regulate the pH.

For redder colours, acidifiers can be added in an amount of 0 to 10 wt % to reach a pH of below 7. Suitable acidifiers are citric acid, acetic acid, ascorbic acid, phosphoric acid, lactic acid or any other acid acceptable for the use in food. Preferably the acidifiers are selected from the group of ascorbic acid, citric acid, or combinations thereof. The acidifier is preferably added in an amount of 1 to 8 wt %, more preferably 1 to 5 wt % and most preferably in an amount between 1.5 and 2 wt %.

For greener colours, a base can be added in an amount of 0 to 10 wt % to reach a pH above 7. Suitable bases are sodium hydroxide, calcium hydroxide or any other base acceptable for the use in food. Preferably calcium hydroxide is added. The base is added preferably in an amount of 0 to 6 wt %, more preferably in an amount of 0.1 to 2 wt % and most preferably in an amount of 0.5 to 1.0 wt %.

The colouring composition may further comprise other colorants such as caramel, beetroot extracts, grape skin, beta-carotene or other, or combinations thereof.

The solvents as referred to herein can be selected from the group of water, mono alcohols or polyols which are suitable for use in foodstuffs such as but not limited to ethanol, glycerol, propylene glycol, glucose syrup, trehalose, or a combination thereof. Water, ethanol, glycerol and propylene glycol or combinations thereof are preferred. The ratios of solvents that can be used can reach from between 100 wt % water and 0 wt % alcohol or polyol to 0 wt % water and 100 wt % alcohol or polyol, explicitly including mixtures of water and alcohol or polyol within these ranges. Preferred is a mixture of water and alcohol or polyol in a ratio of between 100:0 to 0:100, more preferably the ratio is between 100:00 and 20:80, most preferred is a ratio of 100:0.

The inventors investigated the root cause of the colour change. Many classes of coloured compounds present in plants were tested in the raw material of the *Justicia* plant. Most likely responsible compounds were identified as hemoglobin, to be found in several *Justicia* genus plants, chlorophyll, anthocyanins, phenol compounds, such as caffeic acid, chlorogenic acid, neochlorgenic acid, gallic acid, and flavonoids, such as vitexin, rutin, apigenin, isovitexin, myricitrin and lutein. The only positive result, leading to a colour change was with lutein and this was only observed if also iron was present in the composition. Therefore, the inventors entertain the theory, but do not intend to be bound by it, that the interaction of lutein with the iron in the ferrous state, both present in the plant and the plant extract, leads to the colour change upon heating actuated by an oxidation process of the iron in complexation with lutein from the ferrous to the ferric state. Chlorophyll may play a role in this colour change as well but the inventors did not find a clear indication of its contribution yet. If the extract is used for colouring plant-based substrates like in meat analogues, the colour change is irreversible upon heating to temperatures of above 160° C.

In a further embodiment of the invention the colouring composition comprises iron in an amount of at least 20 ppm, preferably between 20 and 400 ppm, more preferably between 40 and 300 ppm or most preferably between 40 and 260 ppm, and wherein the iron is preferably in the ferrous state.

"Heating" as mentioned in the present invention shall mean any form of elevation of temperature typically used in households, restaurant kitchens or industrial food production, including for example heating with a cooking pan, in a conventional oven, a microwave oven, on a hot plate, or with an infrared or induction heating. Typical temperatures for heating are between 160° C. and 350° C., preferably between 200° C. to 300° C., more preferably between 220° C. to 300° C. and most preferably between 280° C. to 290° C. Typical heating intervals are 3 to 10 minutes, preferably 3 to 7 minutes, most preferably 5 to 7 minutes, particularly when in direct contact with a hot plate. The foodstuff product may need to be flipped in order to apply heat to all sides of the product. If the heat is applied in form of heated air, like in a convection oven, typical heating intervals are 20 to 60 minutes, preferably 30 to 50 minutes and more preferably 35 to 40 minutes.

The foodstuff as defined herein is plant-based, may comprise meat, and comprises the food colouring composition, as well as an oil or fat, and/or a protein and/or carbohydrates as defined herein below.

In another embodiment of the invention, the foodstuff as defined herein comprises iron in an amount of at least 0.01 ppm, preferably at least 0.1 ppm or more preferably at least 0.5 ppm iron or most preferably at least 1 ppm preferably wherein the iron is in the ferrous sate.

"Plant-based protein" as referred to herein above, or referred to as plant-derived protein, comprises but is not limited to black bean protein, canola protein, chickpea protein, fava bean protein, green bean protein, hemp protein, lentil protein, lupin protein, oat protein, pea protein, red bean protein, rice protein, sunflower seed protein, soybean protein, wheat protein, or combinations thereof.

The carbohydrates comprised in the foodstuff may be one or more carbohydrates preferably selected from but not limited to monosaccharide, disaccharides, oligo- and/or polysaccharides such as glucose, fructose, galactose, mannose, lactose, sucrose, amylopectin, amylose, starch, particularly cassava starch, beta-glucan, dextrin, maltodextrin, inulin, and others. The colouring composition can further comprise certain carbohydrate based gums such as but not limited to cashew gum, Arabic gum or carob (locust bean gum).

In another embodiment of the present invention, the plant-based foodstuff may further comprise one or more oil or fats, preferably of natural origin and, but not limited to, vegetable-sourced, selected from the group consisting of algae oil, canola oil, coconut oil, corn oil, cottonseed oil, flaxseed oil, oat oil, olive oil, palm oil, peanut oil, rapeseed oil, safflower oil, sesame oil, soybean oil, sunflower oil or combinations thereof, or from animal fats.

In one embodiment of the present invention, the plant-based foodstuff may further comprise one or more other flavouring compounds or flavour enhancers. Preferably, the flavouring compounds or flavour enhancers may be selected from natural flavours, artificial flavours, spices, seasonings, and the like, synthetic flavour oils and flavouring aromatics and/or oils, oleoresins, essences, distillates, and extracts derived from plants, leaves, flowers, fruits, and so forth. Most preferred are natural flavouring compounds or flavour enhancers.

"Flavour enhancers" as used herein are compounds that are added to a food in order to supplement or enhance its own natural flavour by increasing the perception of salt and a umami taste note. A well-known example of such a flavour enhancer is monosodium glutamate. As an example, herbs or seaweeds can be used as natural flavour enhancers.

As used herein, the term "other flavouring compounds" refers to any substance beside the colouring composition that is capable of imparting a detectable flavour impact, for example at a concentration below 0.1 wt %, more preferably below 0.01 wt %.

For example, the provided colouring composition comprises another flavouring substance in an amount of at least 0.5 wt %, preferably at least 1 wt %, based on the total weight of the composition. Typically, in the provided colouring composition, the colouring composition and the other flavouring compounds as defined above are employed in a weight ratio within the range of 10:1 to 1:100, preferably in a weight ratio of 5:1 to 1:50.

Typical examples of colouring compositions according to the present invention include plant-based meat analogues, bouillons, processed meat or hybrid meat plant-based proteins.

For example, a product according to the invention is a plant based meat analogue product. It is made from vegetable ingredients, and is also referred to as plant-based meat, vegan meat, meat substitute, mock meat, meat alternative, imitation meat, or vegetarian meat. Such a plant-based product can be provided in the form of burger patties, sausages, cold cuts, schnitzel, minced meat, steak, nuggets, and others.

In another embodiment the colouring composition further comprises a compound selected from the group glycerol, or propylene glycol, or glucose syrup, or polysorbate, or trehalose, or combinations thereof.

In a further aspect, the present invention pertains to the use of a plant-based food colouring composition as defined herein for modulating the colour of a foodstuff or a beverage preferably from red to brown.

In yet another aspect, the present invention pertains to a method of providing such a plant-based foodstuff or a beverage comprising the colouring composition that changes its colour upon heating to temperatures between 160° C. and 350° C., preferably between 200° C. to 300° C., more preferably between 220° C. to 300° C. and most preferably between 280° C. to 290° C., the colour change being preferably from red to brown and be achieved by adjusting the food colouring composition's pH to a pH below 7, preferably before heating or cooking. Preferably the pH is adjusted between 4.5 and 6.8, more preferably between 4.5 and 6.5, most preferably between 4.5 and 5.5 to achieve a red colour resembling raw meat. Upon heating temperatures above 160° C., the plant-based foodstuff or beverage comprising the colouring composition changes its colour irreversibly to brown.

A last aspect of the present invention pertains to a method of providing a colouring composition by the steps of (i) milling and sieving the aerial parts of the *Justicia* plant, preferably after drying them, (ii) extracting the aerial parts of the *Justicia* plant by contacting them with a solvent for at least 1 hour, (iii) preferably filtrating the resulting extract (iv) optionally concentrating the resulting extract (v) modulating the pH of the colouring composition to a pH below 7 for colour adjustment to a red colour tone, preferably to a pH between 4.5 and 6.8, more preferably 4.5 and 6.5 and most preferably between 4.5 and 5.5 and (vi) optionally adding glycerol, or propylene glycol, or glucose syrup, or polysorbate, or trehalose, or a combination thereof.

Furthermore, the method of providing a colouring composition wherein the solvent is selected from the group of water, an alcohol or polyol, or a combination thereof, wherein the alcohol or polyol is preferably ethanol, glycerol or propylene glycol wherein the solvent comprises more preferably at least 20 wt % of water, and wherein the solvent is preferably comprised in an amount of 5-20 times the weight of the plant parts.

A further embodiment of the method provided herein is a colouring composition wherein the extraction is carried out at a temperature between 20° C. and 100° C., preferably between 20° C. and 90° C., more preferably between 40° C. and 90° and most preferably between 60° C. and 80° C. The duration of the extraction step can vary between 1 and 24 hours, preferably between 1 and 6 hours, more preferably between 4 and 6 hours and most preferably between 1 and 2 hours.

The solvent used for the extraction of the *Justicia* plant can be used in a ratio of 5-20 times the weight of the plant parts, preferably 5-15 times and more preferably 10-15 times and most preferably 12-15 times the weight of the plant parts.

EXAMPLES

Example 1: Extraction Process of *Justicia* Plant Raw Material

A flow chart of all the steps of the process is shown in FIG. 1. Different conditions and parameters for exemplary samples are given in tables 1, 2, 3a and b below:

Step 1 a) Drying—Optional

The aerial parts, leaves and twigs, of the *Justicia acuminatissima* or *calycina* plant were dried in an oven at temperatures between 40° C. and 60° C. until consistency of about 5 to 15 wt % was reached. Starting with the drying step is preferred for reasons of easier storage and transport, but the raw plant parts can also be used directly, without drying. Samples 1-22 were dried in a SolidSteel drying oven with air circulation, model SSDcr 30L, at 40° C. to reach a humidity of up to 12 wt %

Step 1 b) Milling

The dried plant parts were milled in a hammer mill and afterwards sieved with a 19 mm mesh. The milling step is preferred in order to reduce volume and amount of solvent used, but also the whole plant can be used without milling. Samples 1-22 were milled in a stainless steel Tiger hammer mill and sieved with 19 mm mesh sieves.

Step 2 a): Extraction

The possibly dried and/or milled and sieved parts were mixed with a solvent in an extraction vessel wherein the solvent is used in a ratio of 5-20 times the weight of the sieved plant parts, preferred are 12-18 times, more preferred 10-15 and most preferred are 12-15 times the weight. The solvents used were 100 wt % water, 100 wt % ethanol, or a mixture of water and ethanol in a ratio of between 100:0 to 0:100, preferably 100:20 to 20:80, more preferably 100:0. The extraction mixture was agitated for a duration of between 1 and 6 hours at temperatures between room temperature and 90° C., preferably within 1 and 2 hours at temperatures between 6° and 70° C. For example, at room temperature for 6 hours, at 35° C. for 4 hours, at 65° C. for 2 hours, 70° C. for 1 hour and at 80° C. for 1 hour. The liquid extract is drained off amounting to a drainage liquid of between 50 and 70 wt % of the initial quantity of the extraction solvent. Total solids contained were determined between 1.0 and 3.0 wt % on average, preferably between 1.5 and 2.5 wt %. The drainage liquid had a pH between 6.5 to 9, preferably between 7.5 and 8.0. Samples 1-22 were subjected the extraction conditions listed in table 1 below.

Step 2 b) Filtration

Then the extraction liquid was filtered with a filter press, alternatively a paper lentil filter or a bag filter can be used as well, amounting to a drainage liquid of 45-65 wt %, preferably 55-60 wt % of the initial quantity of the extraction solvent. Total solids remaining were determined to be between 1.3 to 3.8 wt %, preferably between 1.5 and 2.0 wt %, and the pH to be between 6.5 and 9, preferably between 7.5 and 8.0. The filtration step is required to avoid small particles of the raw material be transferred to the final extract. Samples 16-22 were subjected to filtration by a Andritz filter press with a 40×40 cm plate.

Step 2 c) pH Adjustment—Dilution—Optional

The drainage liquid of step 2 a) or step 2 b) has a pH of between 6.5 and 9, preferably between 7.5 and 8. At a pH above 7 the extract is green. To receive a red colour, the pH is adjusted by dilution to achieve a pH between 1 and 7, preferably between 4.5 and 6.8, more preferably between 4.5 and 6.5, most preferably between 4.5 and 5.5. Alternatively, the pH can be adjusted by further adding acidifiers, such as ascorbic acid, citric acid, acetic acid, lactic acid, phosphoric acid or other acceptable acids for the use in food, preferably ascorbic or citric acid, or a combination thereof are used. For samples 16-22 ascorbic acid was added for pH adjustment to achieve a certain pH as shown in table 1 below.

TABLE 1

Samples prepared according to steps 1 to 2 c)

| Sample # | description | Extraction Solvents | Amount of Solvents (n times weight of plant material) | Extraction Temp. | Extraction Duration | pH | Total Solids in wt % | Visual appearance |
|---|---|---|---|---|---|---|---|---|
| 1 | raw material | — | — | — | — | — | 90 | green |
| 2 | extraction selection | water 100 wt % | 12-15 times | 40-50° C. | 4-6 h | 8 | 2.5 | green, slightly cloudy |
| 3 | extraction selection | water 100 wt % | 8-10 times | 80-90° C. | 1-2 h | 8.3 | 2.8 | green, slightly cloudy |
| 4 | extraction selection | water 100 wt % | 5-7 times | 80-90° C. | 1-2 h | 8.2 | 5.7 | green, slightly cloudy |
| 5 | extraction selection | water: ethanol 75:25 wt % | 12-15 times | 80-90° C. | 1-2 h | 7.9 | 2.3 | dark green, slightly cloudy |
| 6 | extraction selection | water: ethanol 50:50 wt % | 12-15 times | 40-50° C. | 4-6 h | 8.4 | 2.0% | dark green, slightly cloudy |
| 7 | extraction selection | water: ethanol 50:50 wt % | 12-15 times | 60-70° C. | 1-2 h | 8.4 | 2.0 | dark green, slightly cloudy |
| 8 | extraction selection | water: ethanol 25:75 wt % | 12-15 times | 60-70° C. | 1-2 h | 7.9 | 1.7 | dark green, limpid |
| 9 | extraction selection | ethanol 100 wt % | 18-20 times | 20-25° C. | 20-24 h | 8.4 | 2.0 | dark green, limpid |
| 10 | extraction selection | ethanol 100 wt % | 12-15 times | 60-70° C. | 1-2 h | 8.4 | 2.1 | dark green, limpid |
| 11 | extraction selection | water: glycerol 50:50 wt % | 12-15 times | 20-25° C. | 20-24 h | 8.6 | — | reddish green, limpid |
| 12 | extraction selection | glycerol 100 wt % | 12-15 times | 20-25° C. | 20-24 h | 8.6 | — | reddish green, limpid |
| 13 | extraction selection | propylene glycol 100 wt % | 12-15 times | 20-25° C. | 20-24 h | 8.5 | — | reddish green, limpid |
| 14 | extraction selection | water 100 wt % | 12-15 times | 60-70° C. | 1-2 h | 8.3 | 2.6 | green, cloudy |
| 15 | filtrate of sample 14 | water 100 wt % | 12-15 times | 60-70° C. | 1-2 h | 8.2 | 2.6 | green, slightly cloudy |
| 16 | sample 15 pH adjusted | water 100 wt % | 12-15 times | 60-70° C. | 1-2 h | 4.5 | 2.8 | intense red, slightly cloudy |

Step 3 Concentrate:

Extraction liquid is concentrated at temperatures between 50° C. and 90° C., preferably between 75° C. and 80° C. within 2 to 6 hours to result in solids of 25 to 55 wt %, preferably 45 to 50 wt %. Sample 17 has been concentrated in a multistage vacuum falling film evaporator at temperatures between 75° C. and 80° C. and at a pressure of 140 mbar within 2 hours to result in 45 to 50 wt % in solids.

Steps 4 to 6—Dry Extract, Dry Blended Extract and Concentrates:

In a next step, the concentrate may be used directly by blending it with solid or liquid excipients and/or it is further concentrated until dry.

Step 4 a) Blending—Resulting in Dry Extract and Dry Blended Extracts

For the dry blended extract the concentrated from step 3 extract is heated to temperatures between 60° C. and 80° C., preferably between 75° C. and 80° C. and then blended directly with the respective excipient or blend of excipients in a ratio of excipient:extract between 1:99 and 70:30, preferably between 45:55 and 50:50, or a mixture of excipients in a ratio of total *Justicia* solids and excipients being between 30:70 and 95:5, preferably between 40:60 and 25:75, more preferably between 45:55 and 55:45.

Excipients used for blending are arabic gum, dextrin, inulin, starch, rice flour, cashew gum, cassava starch, maltodextrin, pea protein, soy protein, carob, oat, or other excipients for encapsulation in drying, preferably maltodextrin such as derived from corn or cassava are used.

The mixture is blended until complete homogenization of excipients is achieved. If necessary, either an additional homogenization step or a milling step is introduced.

Steps 4 b)—Blended Concentrates:

The colouring composition concentrate of step 3 is heated at temperatures between 60° C. and 80° C., preferably at temperatures between 65° C. and 70° C., and then blended with liquid excipients, serving as a preservative or a diluent, such as glycerol, propylene glycol, glucose syrup, polysorbate, trehalose, or combinations thereof. The ratio of the concentrated extract of step 3 and the liquid excipient can vary between 80:20 and 40:60, preferably between 60:40 and 40:60, more preferably between 55:45 and 45:55.

Step 5 a) Sterilization

To ensure that the final colouring composition is within acceptable levels of microbiological contaminants for the use in food products the dry blended extract or the dry extract are sterilized by heating the extracts according to the following conditions:

Temperature inlet: 90° C. to 125° C., preferably 90° C. to 95° C.

Temperature outlet: 60° C. to 70° C., preferably 60° C. to 65° C.

Time: 3 seconds to 5 seconds at 90° C. to 125° C., preferably min. 5 seconds at 90° C. to 95° C., more preferably 5 seconds at 120° C. to 125° C.

Flow rate: 400 to 600 L/h, preferably 500 L/h.

Samples 18-21, and 26-31 accordingly, have been sterilized according to step 5 a) at an inlet temperature of 90° C. to 95° C. and an outlet temperature of 60° C. to 65° C. for 5 seconds at a flow rate of 500 L/h.

Step 5 b) Sterilization of Blended Concentrates

To ensure that the final colouring composition is within acceptable levels of microbiological contaminants for the use in food products the concentrated extracts are sterilized by heating the extracts according to the following conditions:

Temperature inlet: 90° C. to 125° C., preferably 90° C. to 95° C.

Temperature outlet: 60° C. to 70° C., preferably 60° C. to 65° C.

Time: 3 seconds to 5 seconds at 90° C. to 125° C., preferably min. 5 seconds at 90° C. to 95° C., more preferably 5 seconds at 120° C. to 125° C.

Flow rate: 400 to 600 L/h, preferably 500 L/h.

Sample 22 has been sterilized according to step 5 b) at an inlet temperature of 90° C. to 95° C. and an outlet temperature of 60° C. to 65° C. for 5 seconds at a flow rate of 500 L/h.

Step 6 a) Drying—Resulting in Dry Extract and Dry Blended Extract

The dry extract and the dry blended extract comprising the colouring composition are obtained by drying at temperatures of 130° C. to 200° C., preferably between 155° C. and 160° C., until consistency, having a final humidity of up to 10%, preferably less than 5%. For drying, a vacuum dryer, spray dryer or fluidized bed dryer can be used, preferred is a spray dryer. But the dry extract and the dry blended extract can also be obtained by lyophilisation.

Samples 18-21 have been dried in a GEA Niro spray dryer at a temperature range of 155° C. to 160° C.

An overview of all the samples prepared according to the different steps are given in tables 1 and 2, while tables 3a and 3b provide the results of the CIELAB colour measurements and the iron content of some of the samples.

TABLE 2

Samples prepared according to steps 3 to 6

| Sample # | description | based on sample # | excipient (solid or liquid) Amount in wt % | pH after adjustment | Total Solids in wt % | visual appearance |
|---|---|---|---|---|---|---|
| 17 | concentrated extract | 16 | — | 4.5 | 45-50 | intense dark red, cloudy |
| 18 | dry extract | 16 | — | 5 | 100 | dark reddish brown, powder |
| 19 | dry extract & maltodextrin | 18 | maltodextrin (s) 50 | 4.94 | 100 | reddish brown, powder |
| 20 | dry extract & pea protein | 18 | pea protein (s) 50 | 5.74 | 100 | dark brownish red, powder |
| 21 | dry extract & maltodextrin/ pea protein | 18 | maltodetrin (s) and pea protein (s) 25 and 25 | 5 | 100 | reddish brown, powder |

TABLE 2-continued

| Samples prepared according to steps 3 to 6 | | | | | | |
|---|---|---|---|---|---|---|
| Sample # | description | based on sample # | excipient (solid or liquid) Amount in wt % | pH after adjustment | Total Solids in wt % | visual appearance |
| 22 | concentrated extract & glycerol | 17 | glycerol (I) 50 | 5 | 100 | dark red, cloudy |

TABLE 3a

| Results and parameters with visual colour appearance and CIELAB values | | | | | |
|---|---|---|---|---|---|
| Sample # | description | visual colour | L* | a* | b* |
| 16 | adjusted pH | intense red | 25.12 | 2.29 | 1.06 |
| 17 | concentrated extract | intense dark red | 24.35 | 0.17 | 0.48 |
| 18 | dry extract | dark reddish brown | 42.99 | 5.76 | 8.01 |
| 19 | dry extract & maltodextrin | reddish brown | 50.27 | 7.82 | 8.56 |
| 20 | dry extract & pea protein | dark brownish red | 46.32 | 3.45 | 5.13 |
| 21 | dry extract & maltodextrin/ pea protein | reddish brown | 48.99 | 6.04 | 7.18 |
| 22 | concentrated extract & glycerol | dark red | 23.84 | 0.27 | 0.47 |

Samples 1 and 17-22 were analysed for its iron content. Sample 1 contained 260 ppm of iron while samples 17-22 had an iron content of between 40 and 160 ppm, basically depending on the amount of excipient comprised in the final extract used to blending. The iron contents of the different samples are given in table 3b below.

TABLE 3b

| Iron content of samples 1 and 17-22 | | |
|---|---|---|
| Sample # | description | Iron (Fe) content in ppm |
| 1 | raw material | 260 |
| 17 | concentrated extract | 80 |
| 18 | dry extract | 160 |
| 19 | dry extract & maltodextrin | 80 |
| 20 | dry extract & pea protein | 80 |
| 21 | dry extract & maltodextrin/ pea protein | 80 |
| 22 | concentrated extract & glycerol | 40 |

Example 2: Sensory Testing

Determining the samples with the best sensory profile, in a first stage the extracts were evaluated by a panel of 10 people trained in sensory testing. In this first phase a selection was made with all samples having the best sensory profile comparable to the sensory notes characteristic for the extracted raw material which are herbal, astringent and metallic residual. Selected were those samples that presented the highest intensity of the residual metallic note.

For the first sensory testing samples 1 to 14 were presented while sample 1 served as the sensory standard. The samples were prepared using a certain amount of the extract sample and diluting it with 100 mL of water. Detailed amounts are given in table 4. The samples were then presented in coded disposable polyethylene cups. For the evaluation the panellists received a sheet of paper for recording their observations, sensory impression and preferences.

Providing the best sensory profiles, the samples received in the extraction process using 100 wt % water as a solvent, i.e. based on sample 14, were selected to proceed with for the next steps in order to determine the most favourable sensory profiles in the final products.

In the second stage, samples from all steps (steps 1 to 6) performed to obtain the dry, blended and concentrated extracts were evaluated by the same panellists to assess whether the taste and odour notes of the raw material grades (herbal, astringent and residual metallic) were preserved during processing and if there was the perception of alteration of some of the notes.

The samples 16-22 were evaluated in the same way as described above for samples 1-14. The samples for testing were prepared using a certain amount of the extract sample and diluting it with 100 ml of water. Detailed amounts are given in table 4.

The panellists found that the dry extracts of *Justicia* contained the characteristic taste and odour notes of the raw material-herbal, green, astringent, metallic residual-well preserved, and a slight caramelized taste note was perceived to be added in all samples that underwent extended thermal treatment, which are samples 17-22.

The sensory testing of the extraction process samples 1-14 revealed that the best samples were samples 3 and 14 presenting less intense herbal taste notes and more intense metallic taste notes best to resemble blood. These samples were selected to proceed to the next steps.

The sensory profiles of both the trained panel evaluations for samples 1-22 are provided below in table 4.

TABLE 4

| Flavour assessment of samples 1-22 | | |
|---|---|---|
| Sample # | Sensory Preparation | Sensory evaluation |
| 1 | 1 g of drainage in 100 mL water at 80° C. | herbal, astringent, metallic residual |
| 2 | 1 g of drainage in 100 mL water at 25° C. | herbal, astringent, metallic residual less intense than samples 3 and 14 |
| 3 | 1 g of drainage in 100 mL water at 25° C. | herbal, astringent, metallic residual intense |
| 4 | 1 g of drainage in 100 mL water at 25° C. | herbal more intense, astringent, metallic residual |
| 5 | 1 g of drainage in 100 mL water at 25° | herbal intense, alcoholic, astringent, metallic residual |
| 6 | 1 g of drainage in 100 mL water at 25° C. | herbal intense, astringent, metallic residual |
| 7 | 1 g of drainage in 100 mL water 25° C. | herbal intense, astringent, metallic residual |

TABLE 4-continued

| Flavour assessment of samples 1-22 | | |
|---|---|---|
| Sample # | Sensory Preparation | Sensory evaluation |
| 8 | 1 g of drainage in 100 mL water at 25° C. | herbal intense, astringent, metallic residual |
| 9 | 1 g of drainage in 100 mL water at 25° C. | herbal intense , astringent, metallic residual |
| 10 | 1 g of drainage in 100 mL water at 25° C. | herbal intense, astringent, metallic residual |
| 11 | 1 g of drainage in 100 mL water at 25° C. | herbal, sweet, astringent, metallic residual |
| 12 | 1 g of drainage in 100 mL water at 25° C. | herbal, sweet, astringent, metallic residual |
| 13 | 1 g of drainage in 100 mL water at 25° C. | herbal, sweet, astringent, metallic residual, slightly bitter. |
| 14 | 1 g of drainage in 100 mL water at 25° C. | herbal, astringent, metallic residual intense |
| 15 | 1 g of drainage in 100 mL water at 25° C. | herbal, astringent, metallic residual |
| 16 | 1 g of drainage in 100 mL water at 25° C. | herbal, astringent, metallic residual |
| 17 | 0.3 g of drainage in 100 mL water at 25° C. | herbal, astringent, slightly caramelized, metallic residual, slightly acid |
| 18 | 0.2 g of drainage in 100 mL water at 25° C. | herbal, astringent, caramelized, metallic residual, slightly acid |
| 19 | 0.3 g of drainage in 100 mL water at 25° C. | herbal, astringent, slightly caramelized, metallic residual, slightly acid |
| 20 | 0.3 g of drainage in 100 mL water at 25° C. | herbal, astringent, slightly caramelized, metallic residual, green vegetable (pea), slightly acid |
| 21 | 0.3 g of drainage in 100 mL water at 25° C. | herbal, astringent, slightly caramelized, metallic residual, green vegetable (pea), slightly acid |
| 22 | 0.3 g of drainage in 100 mL water at 25° C. | herbal, astringent, slightly caramelized, metallic residual, sweet |

Example 3: Apply

For the application of the colour composition in meat analogue products, samples have been prepared as a base for plant-based burger patties.

Preparation of the Vegetable Base as Meat Analogue:

The base was obtained by weighing and blending the following ingredients in the given amounts manually: vegetable protein (pea protein 65 wt %), powdered spices and flavours (0.5 wt %), preservative (ascorbic acid, 0.1 wt %)), 2 wt % of a colouring composition as listed in tables 5a and 5b, water (18 wt %) and vegetable oil (12 wt %).

In addition, in samples 30 and 31 0.3 wt % citric acid has been added to the base for intensifying the red colour of the colouring compositions before heating.

Preparing the Meat Analogue Burger Patty:

The base has been blended and homogenized with 1-2 wt % of different colouring compositions with *Justicia* dry extracts and/or other colorants as listed below in table 5a and then frozen.

Also comparative examples were prepared with colorants that are not able to provide a colour change upon heating nor able to impart a metallic taste or odour. Used as such colorants were caramel class IV and a commercially available beetroot extract. For that, each colorant was blended and homogenized in an amount of overall 2 wt % of the colorant with the base, and the coloured base was then frozen. In the case of the beetroot sample a mixture of 1.7 wt % *Justicia* dry extract (sample 19) with 0.3 wt % beetroot extract was used, blended with the base ingredients as described above and homogenized.

Frying:

All samples including comparative examples have been defrosted and then, in case of examples 23-31, fried for 5 minutes in a frying pan at 220° C., while frying it for 3 minutes on one side and 2 more minutes on the flip side.

Table 5a provides an overview on the samples, amounts and conditions used in example 3 while the sensory and visual results of the samples' testing are provided in table 5b.

FIGS. 2-6 show the samples 23-31 before and after frying in different perspectives.

Table 6 further provides the LAB colour measurements of samples 25-29.

Sensory Testing of the Meat Analogue Burger Patties:

Samples 23-31 were presented for a sensory testing to the same trained panel as in example 2. The samples were presented on a plate with small pieces of the burger patties, each of which were coded. And the panellists were provided with a sheet of paper for recording their observation, impressions and preferences.

The results of the sensory testing are provided in table 5b.

TABLE 5a

| Sample overview on burger patties with different colorants | | |
|---|---|---|
| Resulting sample # | Based on Sample # | Colorant added to the base in wt % |
| 23 | 17 | colouring composition and beetroot extract 1.7 and 0.3 |
| 24 | 17 | caramel class IV 1.0-1.5 |
| 25 | 17 | pure base |
| 26 | 17 | colouring composition 1.5-2.0 |
| 27 | 17 | colouring composition 1.5-2.0 |
| 28 | 17 | colouring composition 1.5-2.0 |
| 29 | 17 | colouring composition 1.5-2.0 |
| 30 | 17 | colouring composition and citric acid 1.5-2.0 and 0.3 |
| 31 | 17 | colouring composition and citric acid 1.5-2.0 and 0.3 |

TABLE 5b

Burger patties samples before and after frying-visual and sensory appearance

| Resulting sample # | Based on sample # | Colorant in wt % | Visual colour evaluation before and after frying: before | after | Sensory profile after frying |
|---|---|---|---|---|---|
| 23 | 19 | colouring composition and beetroot colorant 1.7 and 0.3 | reddish purple | Dark purple | oily, spicy, grill, salty, metallic residue (similar meat grill) |
| 24 | n.a. | caramel class IV 1.0-1.5 | light brown | dark brown | oily, spicy, grill, salty, vegetable residue |
| 25 | n.a. | without colorant | light yellow | dark yellow | oily, spicy, grill, salty, vegetable residue |
| 26 | 18 | colouring composition 1.0-1.5 | reddish brown | dark brown | oily, spicy, grill, salty, metallic residue |
| 27 | 19 | colouring composition 1.5-2.0 | reddish brown | dark brown | oily, spicy, grill, salty, metallic residue (similar meat grill) |
| 28 | 20 | colouring composition 1.5-2.0 | reddish brown (less intense than sample 27) | dark brown | oily, spicy, grill, salty, metallic residue (similar meat grill) |
| 29 | 21 | colouring composition 1.5-2.0 | reddish brown | dark brown | oily, spicy, grill, salty, metallic residue (similar meat grill) |
| 30 | 19 | colouring composition and citric acid 1.5-2.0 and 0.3 | red intense (more intense than sample 27) | dark brown | oily, spicy, grill, salty, slight citric, metallic residue (similar meat grill) |
| 31 | 21 | colouring composition and citric acid 1.5-2.0 and 0.3 | red intense (more intense than sample 27) | dark brown | oily, spicy, grill, salty, slight citric, metallic residue (similar meat grill) |

TABLE 6

LAB data for burger patties samples 25-29

| Sample # | Frying | L* | a* | b* |
|---|---|---|---|---|
| 25 | Before | 65.73 | 3.84 | 20.67 |
| 25 | After | 58.28 | 7.70 | 22.18 |
| 26 | Before | 40.90 | 6.42 | 9.91 |
| 26 | After | 40.49 | 5.29 | 5.62 |
| 27 | Before | 46.64 | 8.77 | 10.22 |
| 27 | After | 42.72 | 7.64 | 7.34 |
| 28 | Before | 48.53 | 8.33 | 11.57 |
| 28 | After | 43.20 | 7.78 | 7.95 |
| 29 | Before | 45.58 | 6.92 | 12.62 |
| 29 | After | 44.49 | 7.01 | 8.02 |

The iron contents of the samples 23 and 26-31 have been determined. Samples 23 and 27-31 have an iron content of about 1.6 ppm, while sample 26 has an iron content of about 3.2 ppm.

Example 4: Lutein Chromatography Study for Different Samples

Lutein Structure

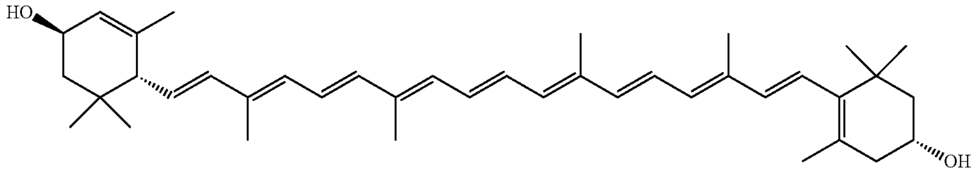 [SMILES: CC1=C[C@H](O)CC(C)(C)[C@H]1/C=C/C(C)=C/C=C/C(C)=C/C=C/C=C(C)/C=C/C=C(C)/C=C/C1=C(C)C[C@@H](O)CC1(C)C]

The inventors intended to find the molecules responsible for the colour change. Possible suspects were phenolic compounds such as chlorogenic acid, neochlorogenic acid, gallic acid, vitexin, isovitexin, apiginine and lutein which are all well characterized. Samples of these molecules served as reference standards. All compounds, well-known ingredients of plant extracts, were injected into the HPLC one by one and identified in the chromatograms of the extracts by comparing the signals of the colouring composition and the suspected compounds by conducting wavelength sweeps from 200 to 400 nm. This study revealed that lutein having a retention time of 42 minutes was the only compound always present in the colouring composition. The optimal method for quantification of lutein is at a wavelength of 350 nm.

A chromatography study was conducted in order to correlate the colour change and specific compounds in the colouring composition. For that, different samples were measured by UV-HPLC with a DAD detector.

Column: Lichrospher C18 (250×4.0 mm×5 μm)

Mobile Phase A: Phosphoric Acid 0.05 wt %, in a 1000 mL volumetric flask containing approximately 800 ml of water ultrapure, add 0.6 mL of phosphoric acid. Fill up the volume of the volumetric flask with ultrapure water and homogenize. Use a membrane filter 0.22 μm or 0.45 μm, transfer into a glass vial and ultrasonically degas for at least 5 minutes.

Mobile Phase B: Phosphoric Acid 0.05 wt % in acetonitrile, in a 1000 mL volumetric flask containing approximately 800 mL of acetonitrile, add 0.6 mL of phosphoric acid. Fill up the volume of the volumetric flask with acetonitrile and homogenize. Use a membrane filter 0.22 μm or 0.45 μm, transfer to a glass vial and ultrasonic degas for at least 5 minutes.

Diluent: Acetonitrile:ultrapure water 2:8

In a beaker, add 20 mL of acetonitrile and 80 mL of ultrapure water and homogenize.

Sample preparation: Weigh 0.5 g of sample and transfer to a 25 mL volumetric flask. Extract with 20 ml of acetonitrile:water 2:8 solution in an ultrasonic bath for 10 minutes, wait for the cooling of the solution and fill up to volume with the acetonitrile:water 2:8 solution.

Homogenize and filter by filter unit 0.22 μm or 0.45 μm into an HPLC vial.

Raw Material Preparation:

Weigh 1 g of the ground plant and transfer to a 250 mL Erlenmeyer flask. Add 100 ml of an ethanol: water solution 6:4 and extract under reflux at 60° C. for 1h. Filter by cotton into a 250 mL Erlenmeyer flask with a ground edge. Transfer the cotton to the Erlenmeyer flask containing the bagasse and extract for another 1 h with another 50 mL of the ethanol: water 6:4 solution under constant stirring and reflux at 60° C. Filter again through cotton, collect the filtrates in the 125 mL Erlenmeyer flask. Concentrate the combined filtrates to dryness on a rotary evaporator. Re-suspend the concentrate with a solution of acetonitrile:water 2:8, transfer to a 25 ml volumetric flask, if necessary, carry out re-suspension with the help of an ultrasonic bath. Fill up the volume of the volumetric flask with the same solution. Homogenize and filter by a filter unit 0.22 μm or 0.45 μm into an HPLC vial.

Preparation of the Lutein Standard:

Weigh out 1.0 mg of the lutein standard and transfer to a 10 mL volumetric flask. Add approximately 8 mL of methanol and leave in an ultrasonic bath for 30 minutes or until complete dissolution. Wait for the solution to cool and fill up to volume with methanol. Homogenize and filter by filter unit 0.22 μm or 0.45 μm into an HPLC vial.

Flow: 0.8 mL/min

Detection: 350 nm

Sweep: 200 to 400 nm

Analysis time: 70 minutes

Injection volume: 20 μL

TABLE 7

Lutein content in samples 14-22

| Sample # | Total solids of justicia in wt % | diluent or excipient in wt % | ascorbic acid in wt % | flavonoids as lutein in wt % |
|---|---|---|---|---|
| 1 | 90-97 | 3-10 moisture | 0 | 0.2 |
| 14 | 1.0-3.0 | 97-99 water | 0 | 0.005 |
| 15 | 1.0-3.0 | 97-99 water | 0 | 0.020 |
| 16 | 1.0-3.0 | 97-99 water | 0.1 | 0.002 |
| 17 | 40-50 | 50-60 water | 5.0 | 0.1 |
| 18 - | 95-100 | 0-5 moisture | 5.0 | 0.2 |
| 19 | 45-55 | 50 maltodextrin | 5.0 | 0.1 |
| 20 | 45-55 | 50 pea protein | 5.0 | 0.1 |
| 21 | 45-55 | 25 pea protein & 25 maltodextrin | 5.0 | 0.1 |
| 22 | 20-25 | 50 glycerin | 5.0 | 0.05 |

The invention claimed is:

1. A colouring composition for foodstuffs or beverages, characterized in that the colouring composition provides a colour change upon heating from red to brown, comprising lutein, iron in the ferrous state and optionally chlorophyll, characterized in that the pH of the colouring composition is below 7, wherein the colouring composition comprises an extract of a plant of the Justicia genus.

2. The colouring composition for foodstuffs or beverages according to claim 1 wherein the colouring composition is plant-based.

3. The colouring composition for foodstuffs or beverages according to claim 1, wherein the colouring composition comprises at least 20 ppm iron, in the ferrous state.

4. The colouring composition according to claim 1, wherein the colour changes from red to brown upon heating to temperatures between 160° C. and 350° C.

5. The colouring composition according to claim 1, wherein the food colouring composition also imparts a bloody, meaty and/or metallic taste note.

6. The colouring composition according to claim 1 further comprising a compound selected from the group: glycerol, or propylene glycol, or glucose syrup, or polysorbate, or trehalose, or combinations thereof.

7. A method of providing a plant-based foodstuff or a beverage that changes its colour upon heating to temperatures between 160° C. and 350° C. from red to brown by adjusting the pH of the food colouring composition of claim 1 to a pH below 7.

8. The method according to claim 7, wherein the pH of the colouring composition is adjusted between 4.5 and 6.8.

9. A method of providing a colouring composition of claim 1 by the steps of (i) milling and sieving the aerial parts of the Justicia plant, (ii) extracting the aerial parts of the Justicia plant by contacting them with a solvent for at least 1 hour, optionally concentrating the resulting extract, (iii) modulating the pH of the colouring composition to a pH below 7 for colour adjustment to a red colour tone, and (iv) optionally adding glycerol, or propylene glycol, or glucose syrup, or polysorbate, or trehalose, or a combination thereof.

10. The method according to claim 9, wherein the solvent is selected from the group of: water, an alcohol, or a combination thereof.

11. The method according to claim 9, wherein the solvent is added in an amount of 5-20 times the weight of the plant parts.

12. The colouring composition according to claim 1, wherein the *Justicia* genus comprises *Justicia acuminatissima* or *calycina*.

* * * * *